United States Patent
Heath et al.

(10) Patent No.: US 10,926,435 B2
(45) Date of Patent: Feb. 23, 2021

(54) FOAM MANDREL ASSEMBLY

(71) Applicant: The Boeing Company, Chicago, IL (US)

(72) Inventors: Richard E. Heath, Mount Pleasant, SC (US); Andrew Elmer Modin, Charleston, SC (US); Richard Alexander Prause, Charleston, SC (US)

(73) Assignee: The Boeing Company, Chicago, IL (US)

( * ) Notice: Subject to any disclaimer, the term of this patent is extended or adjusted under 35 U.S.C. 154(b) by 57 days.

(21) Appl. No.: 15/649,162

(22) Filed: Jul. 13, 2017

(65) Prior Publication Data
US 2018/0319051 A1    Nov. 8, 2018

Related U.S. Application Data

(63) Continuation-in-part of application No. 15/586,153, filed on May 3, 2017.

(51) Int. Cl.
*B29C 43/02* (2006.01)
*B29D 99/00* (2010.01)
(Continued)

(52) U.S. Cl.
CPC ............ *B29C 43/02* (2013.01); *B29C 33/485* (2013.01); *B29C 33/505* (2013.01); *B29C 43/56* (2013.01); *B29C 70/30* (2013.01); *B29C 70/342* (2013.01); *B29D 99/0003* (2013.01); *B29D 99/0014* (2013.01); *B29K 2105/045* (2013.01); *B29L 2031/3076* (2013.01)

(58) Field of Classification Search
CPC ..... B29C 33/485; B29C 33/505; B29C 70/30; B29C 70/46; B29C 70/446; B29C 43/02; B29C 43/56; B29C 70/34; B29D 99/0003; B29D 99/0014; B29K 2105/045; B29L 2031/3076; B64F 5/10
See application file for complete search history.

(56) References Cited

U.S. PATENT DOCUMENTS

| | | |
|---|---|---|
| 4,126,659 A | 11/1978 | Blad |
| 4,681,724 A | 7/1987 | Faiz et al. |

(Continued)

FOREIGN PATENT DOCUMENTS

| | | | |
|---|---|---|---|
| CA | 2923891 A1 * | 3/2015 | ............ B29C 70/34 |
| EP | 2280818 B1 | 10/2014 | |

(Continued)

OTHER PUBLICATIONS

"Polystyrene" from polymerprocessing.com 2001.*
(Continued)

*Primary Examiner* — John L Goff, II
(74) *Attorney, Agent, or Firm* — Yee & Associates, P.C.

(57) ABSTRACT

An illustrative embodiment of the present disclosure provides a method of manufacturing a composite structure. A composite material having a closed cross-section or a partially closed cross-section is cured to form the composite structure, wherein the composite material is in contact with a foam mandrel assembly when curing begins. A supportive foam mandrel in the foam mandrel assembly is collapsed during curing.

13 Claims, 19 Drawing Sheets

(51) Int. Cl.
*B29C 33/50* (2006.01)
*B29C 33/48* (2006.01)
*B29C 70/34* (2006.01)
*B29C 70/30* (2006.01)
*B29C 43/56* (2006.01)
*B29K 105/04* (2006.01)
*B29L 31/30* (2006.01)

(56) References Cited

U.S. PATENT DOCUMENTS

| | | | |
|---|---|---|---|
| 4,767,643 A * | 8/1988 | Westervelt | B29B 15/125 |
| | | | 118/50 |
| 6,458,309 B1 | 10/2002 | Allen et al. | |
| 6,866,738 B2 * | 3/2005 | Sato | B29C 53/04 |
| | | | 156/199 |
| 7,204,951 B2 | 4/2007 | Simpson et al. | |
| 8,734,711 B2 | 5/2014 | Lengsfeld et al. | |
| 9,221,235 B1 * | 12/2015 | Rotter | B32B 37/10 |
| 9,782,937 B1 | 10/2017 | Modin et al. | |
| 2005/0102814 A1 | 5/2005 | Anderson et al. | |
| 2010/0139857 A1 | 6/2010 | Pham et al. | |
| 2010/0239865 A1 * | 9/2010 | Kallinen | B29C 70/46 |
| | | | 428/411.1 |
| 2013/0327479 A1 * | 12/2013 | Ichino | C08J 5/24 |
| | | | 156/307.3 |
| 2014/0099477 A1 | 4/2014 | Matsen et al. | |
| 2016/0121560 A1 | 5/2016 | Lee et al. | |
| 2016/0332395 A1 * | 11/2016 | Abe | B29C 70/446 |
| 2016/0354968 A1 * | 12/2016 | Zamora Rodriguez | |
| | | | B29C 70/443 |
| 2016/0354982 A1 | 12/2016 | Prause et al. | |
| 2017/0043510 A1 | 2/2017 | Heath et al. | |
| 2017/0043540 A1 | 2/2017 | Heath et al. | |
| 2017/0210038 A1 | 7/2017 | Heath et al. | |
| 2018/0319050 A1 | 11/2018 | Prause et al. | |

FOREIGN PATENT DOCUMENTS

| | | | |
|---|---|---|---|
| EP | 2440395 B1 | 11/2014 | |
| EP | 3015258 A1 | 5/2016 | |
| EP | 3075523 A1 | 10/2016 | |
| WO | WO2010089464 A1 | 8/2010 | |
| WO | WO-2015115437 A1 * | 8/2015 | B29C 70/446 |

OTHER PUBLICATIONS

European Patent Office Partial Search Report, dated Sep. 18, 2018, regarding Application No. EP18170338.0, 17 pages.
"Divinycell P", Technical Data Sheet, Diab Group, Feb. 2016, 2 pages.
Prause et al., "Compacted Stringer Packages," U.S. Appl. No. 15/586,153, filed May 3, 2017, 46 pages.
European Patent Office Search Report, dated Jan. 23, 2019, regarding Application No. 18170338.0, 13 pages.
Office Action, dated Jul. 1, 2019, regarding U.S. Appl. No. 15/586,153, 25 pages.
Final Office Action, dated Dec. 20, 2019, regarding U.S. Appl. No. 15/586,153, 9 pages.

* cited by examiner

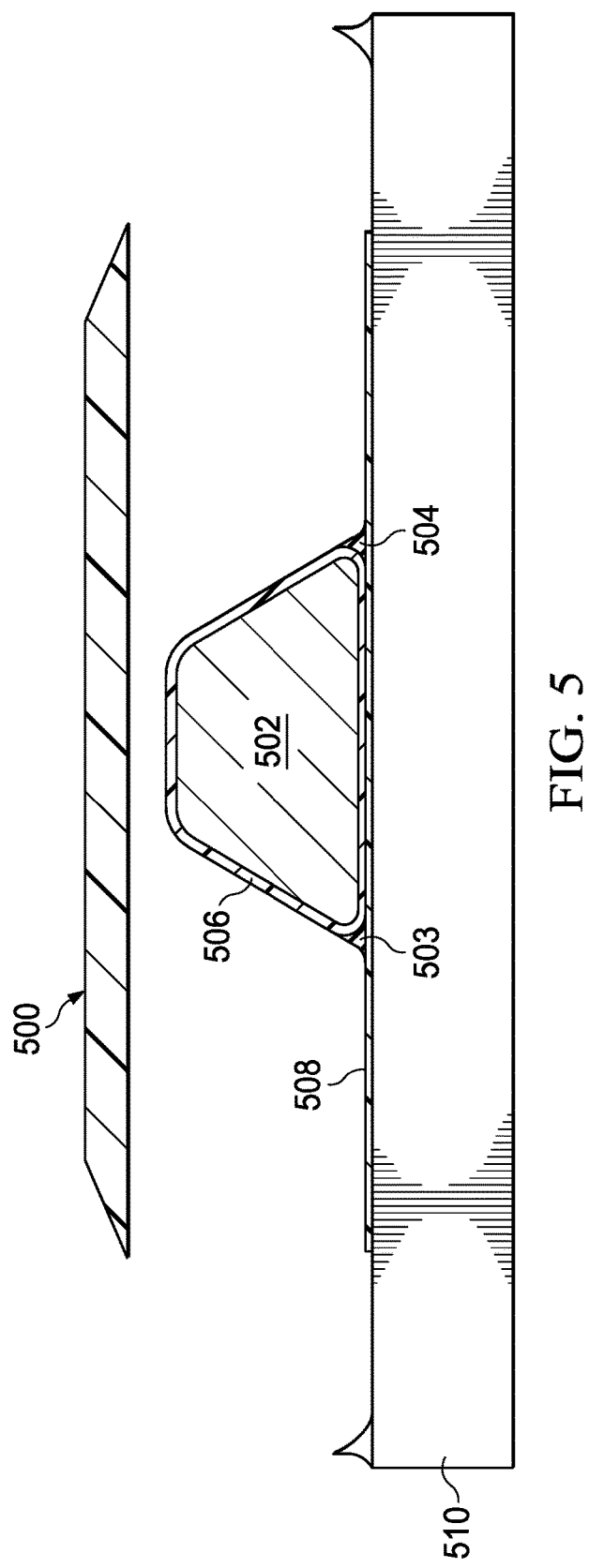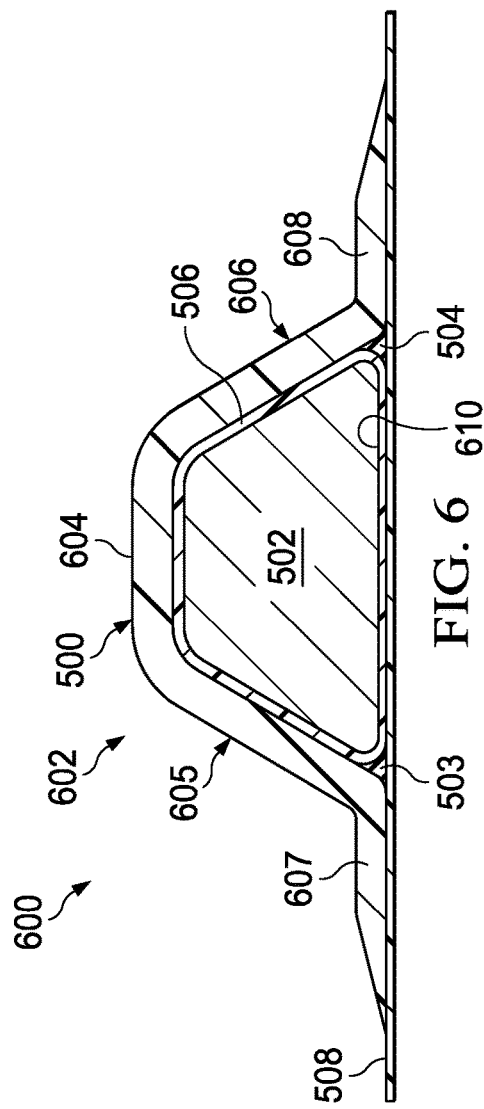

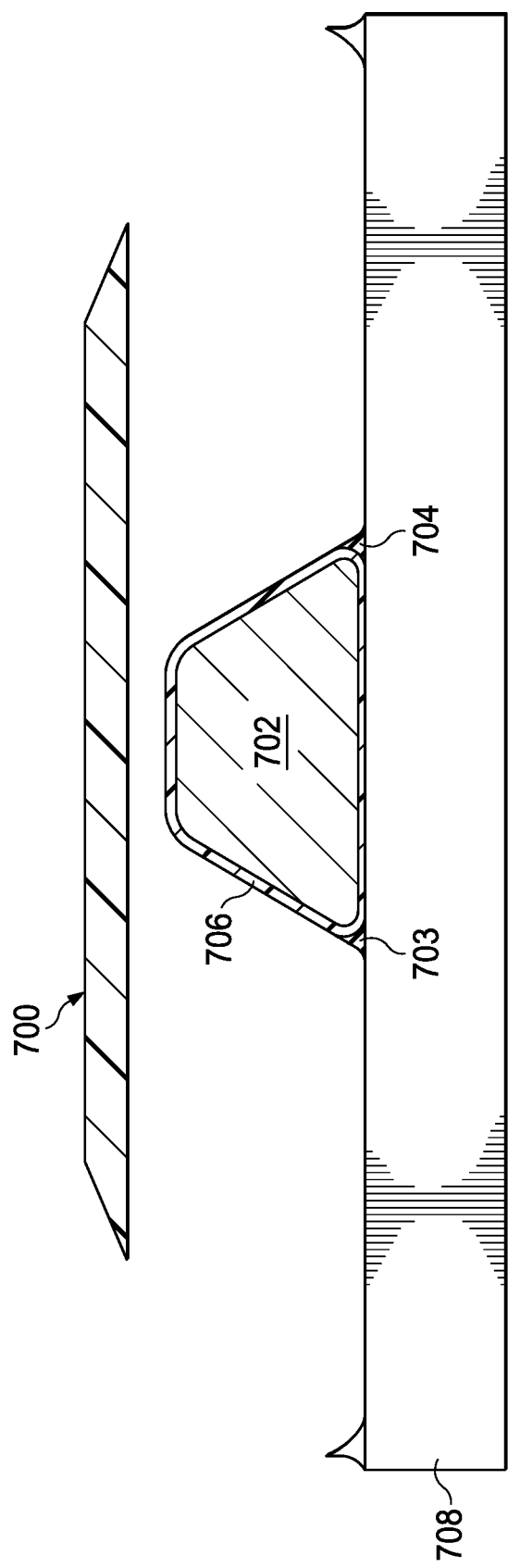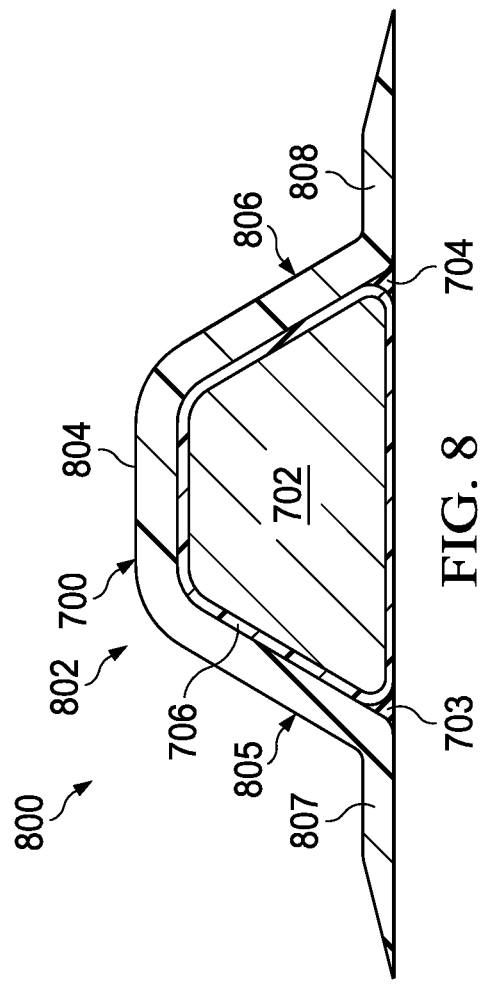

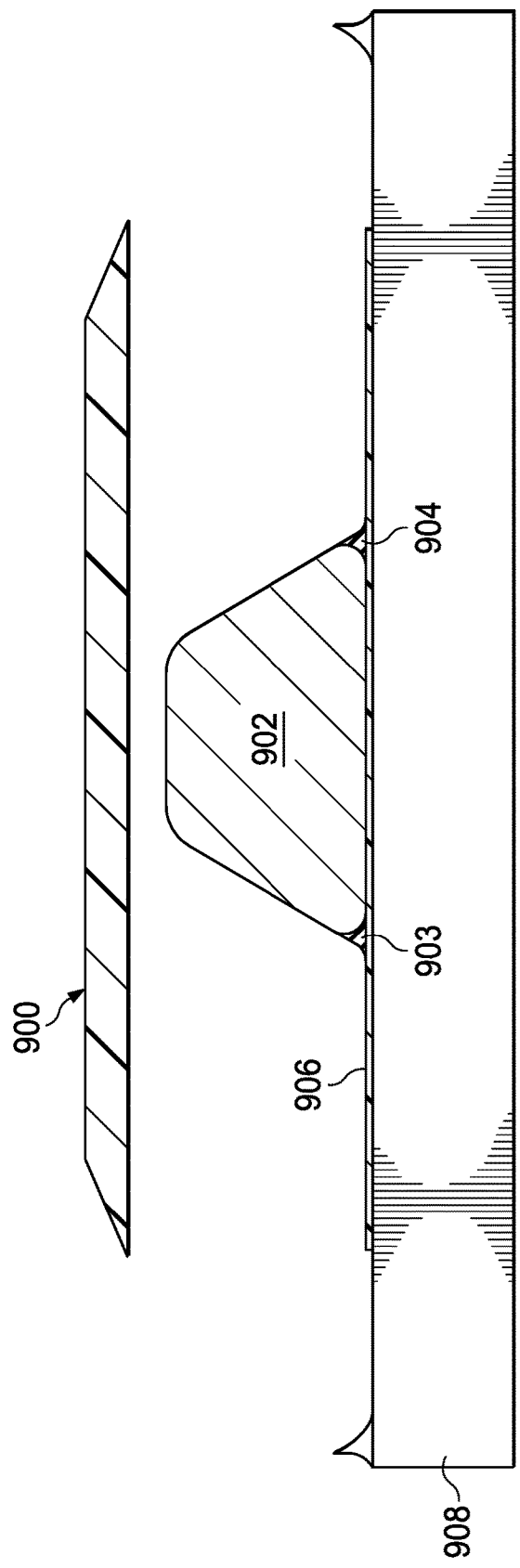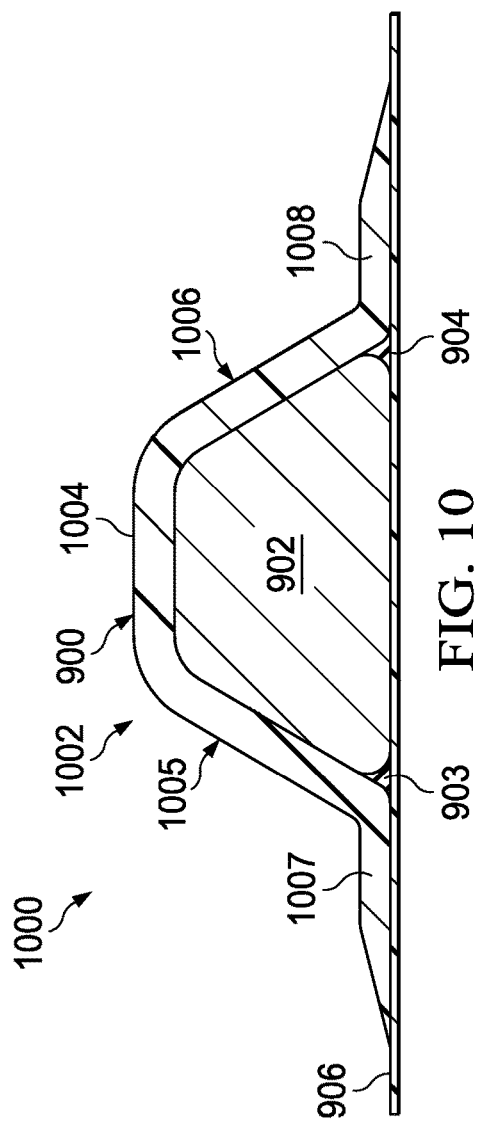

FOAM MANDREL ASSEMBLY

CROSS-REFERENCE TO RELATED APPLICATION(S)

This application is a continuation-in-part of and claims the benefit of priority to U.S. patent application Ser. No. 15/586,153, filed May 3, 2017, and entitled "Compacted Stringer Packages", the entire contents of which are incorporated herein by reference.

BACKGROUND INFORMATION

1. Field

The present disclosure relates generally to manufacturing, and in particular, to composite manufacturing. More particularly, the present disclosure relates to a method and apparatus for composite manufacturing with foam mandrel assemblies.

2. Background

Aircraft generally include an airframe, which may be regarded as an underlying skeleton to which skins are attached to form a smooth aerodynamic outer surface. Stringers of various shapes may be used for stiffening fuselage sections and wing skins on aircraft. Composite materials are used in aircraft to decrease the weight of the aircraft. Modern aircraft may include both composite stringers and composite skins.

Conventionally, composite stringers are attached to a composite skin using fasteners, curing the composite stringers to the composite skin, or a combination of the two. In some conventional processes, composite stringers are assembled on a cure tool common to both the composite stringers and the composite skin.

The cure tool common to the composite stringers and the composite skin is large enough to form a portion of a fuselage. The cure tool may therefore have a large manufacturing footprint. The large manufacturing footprint limits the quantity of cure tools that fit within a manufacturing environment.

To assemble the composite stringers on the cure tool, a number of processes are performed, each of which has an associated performance time. Each stringer component is laid onto the cure tool and then compacted separately. Each process associated with assembling the composite stringers adds to an overall manufacturing time. Manufacturing time may limit a quantity of aircraft produced.

A thermoset composite material is cured at a designated temperature and pressure to create a rigid composite structure. During curing, it is desirable to apply pressure to all portions of the composite material. Applying even pressure produces fewer undesirable inconsistencies in the composite structure.

Fabrication of a composite structure having a closed cross-section or a partially closed cross-section involves placing a tool inside an at least partially trapped cavity. An at least partially trapped cavity makes removal of the tool undesirably difficult. A solid mandrel cannot be used without a straight, line of sight, extraction path from the composite structure. Therefore, it would be desirable to have a method and apparatus that take into account at least some of the issues discussed above, as well as other possible issues.

SUMMARY

An illustrative embodiment of the present disclosure provides a method of manufacturing a composite structure. A compacted stringer package comprising a foam mandrel assembly is formed. The compacted stringer package is placed onto a cure tool. Composite material of the compacted stringer package is cured at an elevated temperature to form the composite structure. A supportive foam mandrel within the foam mandrel assembly is collapsed during curing.

Another illustrative embodiment of the present disclosure provides a method of manufacturing a composite structure. A composite material having a closed cross-section or a partially closed cross-section is cured to form the composite structure, wherein the composite material is in contact with a foam mandrel assembly when curing begins. A supportive foam mandrel in the foam mandrel assembly is collapsed during curing.

A further illustrative embodiment of the present disclosure provides a foam mandrel assembly comprising a supportive foam mandrel, a number of gas impermeable layers, and a release layer. The supportive foam mandrel comprises a material configured to collapse under at least one of elevated temperature or elevated pressure. The number of gas impermeable layers surround the supportive foam mandrel. The release layer surrounds the number of gas impermeable layers.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 5 is an illustration of components of a composite stringer package prior to compacting in accordance with an illustrative embodiment;

FIG. 6 is an illustration of a compacted stringer package in accordance with an illustrative embodiment;

FIG. 7 is an illustration of components of a composite stringer package prior to compacting in accordance with an illustrative embodiment;

FIG. 8 is an illustration of a compacted stringer package in accordance with an illustrative embodiment;

FIG. 9 is an illustration of components of a composite stringer package prior to compacting in accordance with an illustrative embodiment;

FIG. 10 is an illustration of a compacted stringer package in accordance with an illustrative embodiment;

DETAILED DESCRIPTION

Figure 1:
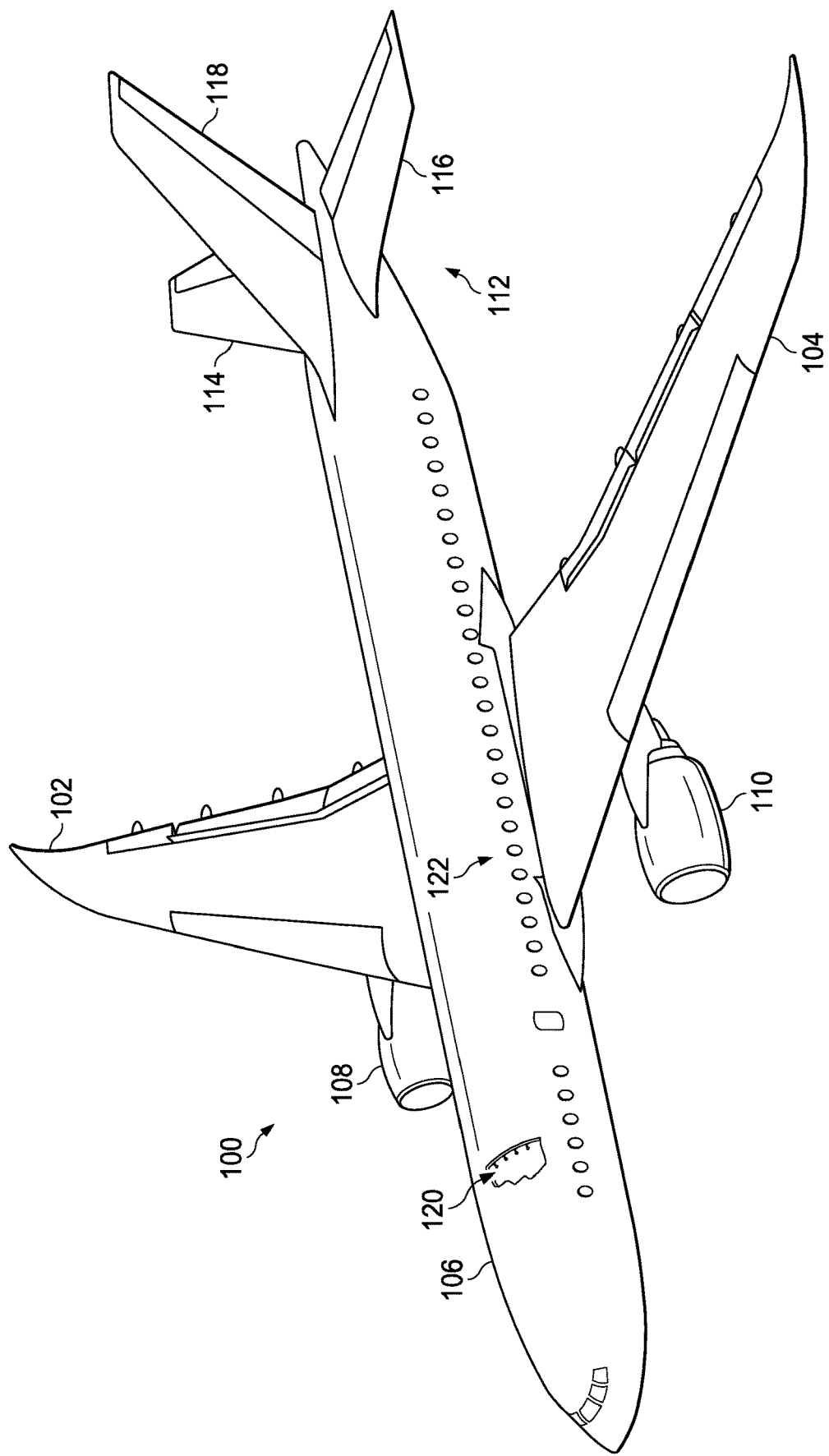
FIG. 1 is an illustration of an aircraft in which an illustrative embodiment may be implemented.

The illustrative embodiments recognize and take into account one or more different considerations. For example, the illustrative embodiments recognize and take into account that composite materials are used in aircraft to decrease weight of the aircraft. This decreased weight improves performance features such as payload capacity and fuel efficiency. Further, composite materials provide longer service life for various components in an aircraft.

The illustrative examples recognize and take into account that to assemble the composite stringers on the cure tool, a number of processes are performed, each of which has an associated performance time. The illustrative examples recognize and take into account that each stringer component is laid onto the cure tool and then compacted separately. The illustrative examples recognize and take into account that each process associated with assembling the composite stringers adds to an overall manufacturing time. The illustrative examples recognize and take into account that manufacturing time may limit a quantity of aircraft produced.

The illustrative embodiments recognize and take into account that composite materials may be tough, light-weight materials created by combining two or more functional components. For example, a composite material may include reinforcing fibers bound in a polymer resin matrix. The fibers may be unidirectional or may take the form of a woven cloth or fabric. The fibers and resins may be arranged and cured to form a composite structure.

The illustrative examples recognize and take into account that composite stringers may be attached to a composite skin using fasteners, curing the composite stringers to the composite skin, or by other desirable methods. The illustrative examples recognize and take into account that the fasteners add to the weight of the aircraft. The illustrative examples thus recognize and take into account that curing the composite stringers to the composite skin is a desirable attachment method.

The illustrative examples recognize and take into account that laying the composite material onto a large cure tool is a time limiting step. Laying the composite material is a layered process. The illustrative examples recognize and take into account that forming composite portions offline from the cure tool may reduce manufacturing time. For example, forming multiple composite stringers offline from the cure tool may reduce the manufacturing time.

The illustrative examples recognize and take into account that a fuselage of an aircraft has a contour. The illustrative examples recognize and take into account that the composite stringers have curvatures to match the contour of the fuselage.

The illustrative examples recognize and take into account that manufacturing tooling is stored when not in use. The illustrative examples thus recognize and take into account that increasing a quantity of manufacturing tools increases storage volume for the manufacturing tools.

The illustrative examples recognize and take into account that interchangeable parts and assembly line processing reduces storage volume. Further, the illustrative examples recognize and take into account that the interchangeable parts and the assembly line processing may reduce complexity of forming a structure. The illustrative examples recognize and take into account that substantially similar composite stringers, such as substantially straight composite stringer lay-ups, may be formed using an assembly line.

The illustrative examples further recognize and take into account that bending complex composite structures, such as the composite stringers, to contours may introduce wrinkles into the composite material. For example, the illustrative examples recognize and take into account that the wrinkles may be introduced into a composite stringer lay-up when forming the composite stringer lay-up to a complex contour of the cure tool. The illustrative examples recognize and take into account that the wrinkles affect the performance of the composite material. The illustrative examples recognize and take into account that the wrinkles may be undesirably difficult to detect.

The illustrative examples recognize and take into account that support is desirably provided to hollow portions of composite materials during curing. For example, rigid tooling or pressurized tooling, such as bladders, may be present in hollow portions of the composite materials during curing.

The illustrative examples recognize and take into account that eliminating any of additional curing steps, additional consolidation steps, or additional layup steps will reduce the manufacturing time. The illustrative examples thus recognize and take into account that consolidating multiple layers of the composite material simultaneously may reduce the manufacturing time. The illustrative examples further recognize and take into account that tooling, which serves multiple purposes, may reduce at least one of the manufacturing time or the manufacturing expense.

The illustrative examples recognize and take into account that in conventional fuselage manufacturing, a consolidated composite section having a hat-shaped cross-section may be placed into a cure tool. Once in the cure tool, any forming tooling still present is removed from the consolidated composite section. After removing the forming tooling, a curing mandrel or a curing bladder is placed into the consolidated composite section. After placing the curing mandrel or the curing bladder, a first radius filler and a second radius filler are positioned in the consolidated composite section. Conventionally, these steps are performed on the cure tool. The illustrative embodiments recognize and take into account that each subsequent step performed on the cure tool increases the amount of manufacturing time to form a component using the cure tool.

The illustrative examples recognize and take into account that forming a stringer onto the tool that holds the cavity shape during cure is not a current practice. The illustrative examples further recognize and take into account that incorporating the first radius filler and the second radius filler into the forming process is not a current process.

The illustrative examples further recognize and take into account that different conventional inflatable tools, flexible tools, or collapsible tools are used within partially trapped cavities of composite structures. For example, the illustrative examples recognize and take into account that elastomeric bladders may be used as tools to apply pressure to inner portions of a composite material during curing. The illustrative examples recognize and take into account that some composite materials may desirably require more support than provided by soft and flexible elastomeric bladders.

The illustrative examples recognize and take into account that collapsible or disassembled hard tooling may be used as tools to apply pressure to inner portions of a composite material during curing. The illustrative examples recognize and take into account that it may be desirable to reduce at least one of the complexity, the weight, or the cost of tooling used to provide pressure during curing of a composite material. For example, the illustrative examples recognize and take into account that reducing complexity of tooling may also reduce manufacturing time by reducing assembly and disassembly time for the tooling. As another example, the illustrative examples recognize and take into account that reducing weight of tooling may make the tooling easier to maneuver. As yet a further example, the illustrative examples recognize and take into account that reducing the weight of the tooling may reduce movement of the tooling within the composite material when the composite material is angled or positioned upside down.

The illustrative examples recognize and take into account that each composite material may have a desirable range of curing temperatures and curing pressures. The illustrative examples recognize and take into account that not all tooling may be desirable at all curing temperatures and curing pressures.

The illustrative examples recognize and take into account that some types of polymeric foam may degrade and outgas at undesirably high temperatures. For example, some types of polymeric foam may degrade and outgas at 350 degrees Fahrenheit. The illustrative examples recognize and take into account the desirability of identifying tools for use in previously undesirably high temperatures.

The illustrative examples recognize and take into account that a greater processing pressure may affect laminate consolidation and porosity. In some illustrative examples, part resin system requires a higher processing pressure (90 psi vs 35 psi). The illustrative examples recognize and take into account that increasing the processing pressure may change the design or material of a closed rigid mold to increase the strength of the mold. The illustrative examples recognize and take into account that a stronger closed rigid mold to contain higher pressures may also increase costs of producing the mold.

The illustrative examples recognize and take into account that the part size and geometry may affect whether a rigid mold may be used to surround the composite material. The illustrative examples recognize and take into account that the size and geometry of the compacted stringer package may cause a closed mold to be undesirably complex or undesirably expensive. The illustrative examples recognize and take into account that the size and geometry of the compacted stringer package may cause applying pressure to the compacted stringer package to be undesirably difficult. The illustrative examples recognize and take into account that when a closed rigid mold is undesirably complex or undesirably expensive, an autoclave or an oven may desirably be used.

The illustrative examples recognize and take into account that it may be desirable to cure a part as a co-cured large part structure rather than as a discrete component. For example, the illustrative examples recognize and take into account that it may be desirable to co-cure a composite skin with a plurality of compacted stringer packages rather than cure each of the plurality of compacted stringer packages individually.

The illustrative examples recognize and take into account that it may be desirable to reduce manufacturing waste. For example, the illustrative examples recognize and take into account that reusable manufacturing equipment or items may reduce manufacturing waste. The illustrative examples recognize and take into account that for single use manufacturing items, it may be desirable to reduce manufacturing waste in other ways. The illustrative examples recognize and take into account that for single use manufacturing equipment or items, it may be desirable for the material of the manufacturing equipment to be recyclable. The illustrative examples recognize and take into account that when a material is recyclable, although the manufacturing equipment is a single use item, the material of the manufacturing equipment may be reused after use of the manufacturing equipment.

With reference now to the Figures and, in particular, with reference to FIG. 1, an illustration of an aircraft is depicted in which an illustrative embodiment may be implemented. In this illustrative example, aircraft 100 has wing 102 and wing 104 attached to body 106. Aircraft 100 includes engine 108 attached to wing 102 and engine 110 attached to wing 104.

Body 106 has tail section 112. Horizontal stabilizer 114, horizontal stabilizer 116, and vertical stabilizer 118 are attached to tail section 112 of body 106.

Aircraft 100 is an example of an aircraft manufactured using compacted stringer packages in accordance with an illustrative embodiment. For example, body 106 may be manufactured using compacted stringer packages. FIG. 1 depicts an exposed view of stiffeners 120. Stiffeners 120 are examples of stringers manufactured using compacted stringer packages.

Aircraft 100 is an example of an aircraft manufactured using foam mandrel assemblies in accordance with an illustrative embodiment. For example, body 106 may be manufactured using foam mandrel assemblies. Stiffeners 120 are examples of stringers manufactured using foam mandrel assemblies. Any other desirable composite component of aircraft 100 may be manufactured using foam mandrel assemblies.

This illustration of aircraft 100 is provided for purposes of illustrating one environment in which the different illustrative embodiments may be implemented. The illustration of aircraft 100 in FIG. 1 is not meant to imply architectural limitations as to the manner in which different illustrative embodiments may be implemented. For example, aircraft 100 is shown as a commercial passenger aircraft. The different illustrative embodiments may be applied to other types of aircraft, such as private passenger aircraft, a rotorcraft, and other suitable type of aircraft.

Figure 2:
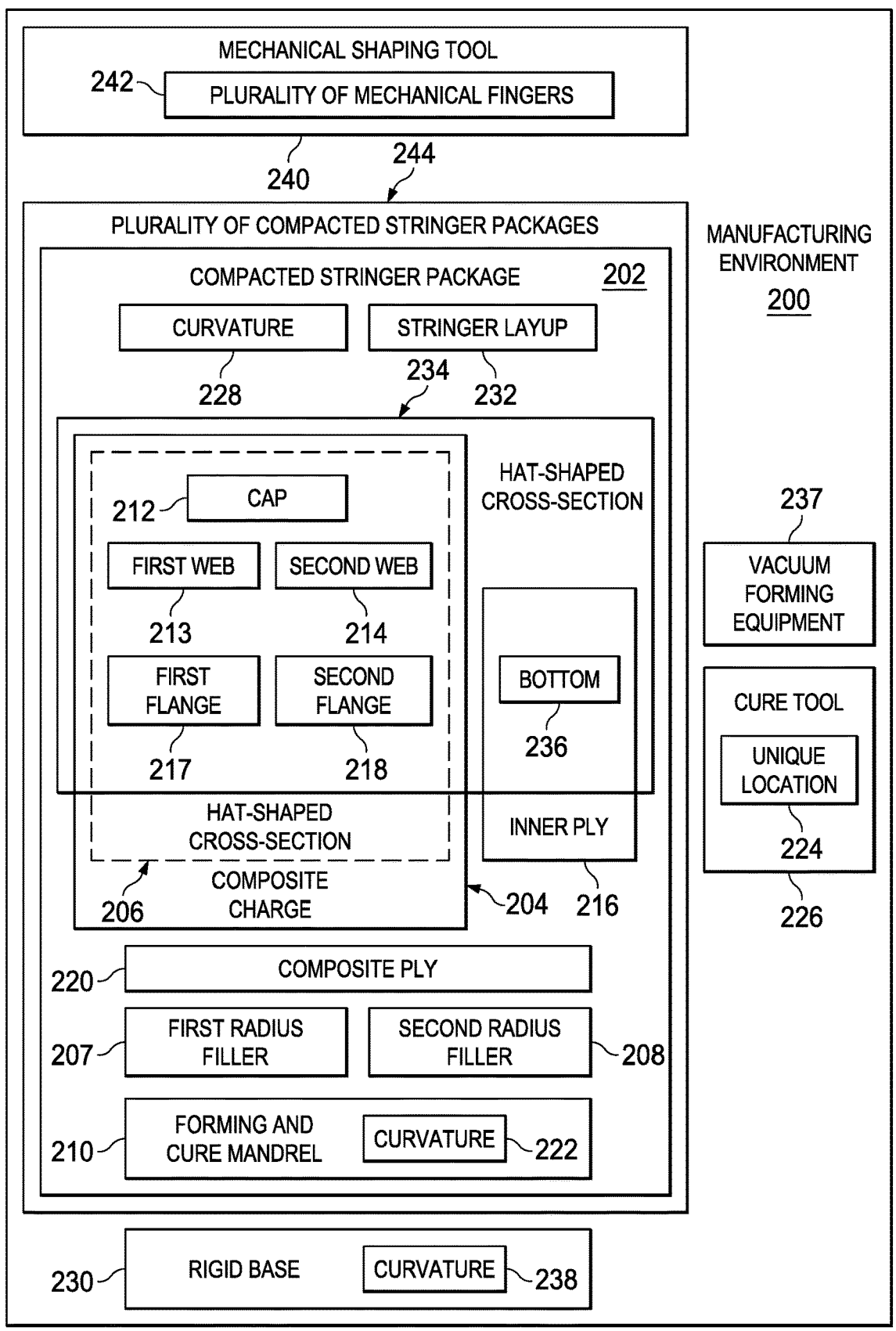
FIG. 2 is an illustration of a block diagram of a manufacturing environment in accordance with an illustrative embodiment.

Turning now to FIG. 2, an illustration of a block diagram of a manufacturing environment is depicted in accordance with an illustrative embodiment. Components of aircraft 100 of FIG. 1 may be formed in manufacturing environment 200. For example, stiffeners 120 of FIG. 1 of aircraft 100 are laid up in manufacturing environment 200.

Compacted stringer package 202 is formed in manufacturing environment 200. Compacted stringer package 202 comprises composite charge 204 having hat-shaped cross-section 206, first radius filler 207 contacting composite charge 204, second radius filler 208 contacting composite charge 204, and forming and cure mandrel 210 positioned within cap 212, first web 213 and second webs 214 of hat-shaped cross-section 206. Cap 212 is positioned between first web 213 and second web 214. First radius filler 207 and second radius filler 208 are positioned on either side of cap 212.

In some illustrative examples, compacted stringer package 202 comprises inner ply 216 connecting first flange 217 and second flange 218 of hat-shaped cross-section 206 and contacting first radius filler 207 and second radius filler 208. First flange 217 is connected to first web 213. Second flange 218 is connected to second web 214. First flange 217 and second flange 218 are on opposite sides of cap 212.

Inner ply 216 is optional to compacted stringer package 202. When present, inner ply 216 helps maintain the shape of compacted stringer package 202. In some illustrative examples, inner ply 216 may be referred to as an "inner mold line" (IML) ply.

In some illustrative examples, compacted stringer package 202 comprises composite ply 220 wrapped around forming and cure mandrel 210. Composite ply 220 is optional to compacted stringer package 202. Composite ply 220 may also be referred to as a "wrap ply." When present, composite ply 220 helps maintain the shape of compacted stringer package 202.

Forming and cure mandrel 210 of compacted stringer package 202 comprises at least one of a collapsible mandrel, a dissolvable material, a solid mandrel, or an inflatable bladder. As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, "at least one of item A, item B, or item C" may include, without limitation, item A, item A and item B, or item B. This example also may include item A, item B, and item C or item B and item C. Of course, any combination of these items may be present. In other examples, "at least one of" may be, for example, without limitation, two of item A, one of item B, and ten of item C; four of item B and seven of item C; or other suitable combinations.

In some illustrative examples, a collapsible mandrel includes foam portions and a rigid center. Collapsing the foam portions of the collapsible mandrel allows for removable of forming and cure mandrel 210 from the remainder of compacted stringer package 202.

When forming and cure mandrel 210 includes an inflatable bladder, the inflatable bladder is formed of any desirable material. An inflatable bladder may be a polymeric material, metallic material, or any other desirable airtight material.

In some illustrative examples, forming and cure mandrel 210 of compacted stringer package 202 has curvature 222 in at least one of an X-Y axis, X-Z axis, or Y-Z axis. In some illustrative examples, curvature 222 is unique to forming and cure mandrel 210. Curvature 222 is designed based on unique location 224 for compacted stringer package 202 on cure tool 226.

Curvature 222 of forming and cure mandrel 210 imparts curvature 228 to compacted stringer package 202. Curvature 222 in the Y-Z plane will be referred to as roll (twist), curvature 222 in the X-Z plane will be referred to as pitch, and curvature 222 in the X-Y plane will be referred to as yaw.

In some illustrative examples, forming and cure mandrel 210 remains in compacted stringer package 202 during curing of compacted stringer package 202 on cure tool 226. In these illustrative examples, forming and cure mandrel 210 is configured to function as a curing bladder.

To form compacted stringer package 202, composite charge 204 is placed over forming and cure mandrel 210, first radius filler 207, and second radius filler 208. When composite ply 220 is present, composite charge 204 contacts composite ply 220, first radius filler 207, and second radius filler 208. When composite ply 220 is not present, composite charge 204 contacts forming and cure mandrel 210, first radius filler 207, and second radius filler 208.

After placing composite charge 204, mechanical pressure is applied to shape composite charge 204 to forming and cure mandrel 210 and rigid base 230 to form stringer layup 232. Vacuum pressure is applied to stringer layup 232 to form compacted stringer package 202 having hat-shaped cross-section 234.

In some illustrative examples, components of a resulting compacted stringer package 202, such as composite charge 204, are ambient temperature while at least one of the mechanical pressure and the vacuum pressure is applied. In other illustrative examples, composite charge 204 or another component of compacted stringer package 202 may be heated while at least one of the mechanical pressure or the vacuum pressure is applied.

Hat-shaped cross-section 234 comprises cap 212 first web 213, and second web 214, one on each side of cap, shaped by forming and cure mandrel 210, and first flange 217 and second flange 218, shaped by rigid base 230. When inner ply 216 is present, hat-shaped cross-section 234 further comprises bottom 236 connecting first flange 217 and second flange 218 and extending underneath cap 212 and first web 213 and second web 214. The vacuum pressure is supplied using vacuum forming equipment 237. Vacuum forming equipment 237 may include at least one of a vacuum bag, a number of seals, tubing, and a vacuum source.

Compacted stringer package 202 is uncured but substantially rigid. Compacted stringer package 202 is rigid enough for transporting within manufacturing environment 200. In some illustrative examples, the mechanical pressure and the vacuum pressure are applied substantially simultaneously.

When composite ply 220 is present, composite ply 220 is wrapped around forming and cure mandrel 210 prior to placing composite charge 204 over forming and cure mandrel 210, first radius filler 207, and second radius filler 208 such that at least one of applying mechanical pressure to shape composite charge 204 or applying vacuum pressure to stringer layup 232 adheres composite charge 204 to composite ply 220. When composite ply 220 is present, composite ply 220 has a trapezoidal cross-section formed by the cross-section of forming and cure mandrel 210.

When inner ply 216 is present, inner ply 216 is placed onto rigid base 230. First radius filler 207 and second radius filler 208 are placed onto inner ply 216 on rigid base 230. Forming and cure mandrel 210 is placed onto inner ply 216 prior to placing composite charge 204 over forming and cure mandrel 210.

After forming compacted stringer package 202, compacted stringer package 202 is removed from rigid base 230. When forming and cure mandrel 210 has curvature 222, rigid base 230 has curvature 238 complementing curvature 222.

Compacted stringer package 202 is then placed into cure tool 226. After curing compacted stringer package 202, forming and cure mandrel 210 is removed from compacted stringer package 202.

The mechanical pressure is applied using mechanical shaping tool 240. Mechanical shaping tool 240 may take any desirable configuration. In one illustrative example, applying the mechanical pressure comprises pressing composite charge 204 using plurality of mechanical fingers 242 by sliding plurality of mechanical fingers 242 across composite charge 204.

Compacted stringer package 202 is one of plurality of compacted stringer packages 244. To form a composite structure, such as a portion of body 106 of FIG. 1, plurality of compacted stringer packages 244 is formed, each comprising a composite charge having a hat-shaped cross-section, a first radius filler contacting the composite charge, a second radius filler contacting the composite charge, and a forming and cure mandrel positioned within a cap, a first web, and a second web of the hat-shaped cross-section. Plurality of compacted stringer packages 244 is placed onto cure tool 226.

Plurality of compacted stringer packages 244 includes any quantity of compacted stringer packages. Although not depicted, plurality of compacted stringer packages 244 includes a respective composite charge having a hat-shaped cross-section, a first radius filler contacting the composite charge, a second radius filler contacting the composite charge, and a forming and cure mandrel positioned within a cap, a first web, and a second web of the hat-shaped cross-section for each respective compacted stringer package of plurality of compacted stringer packages 244.

In some illustrative examples, each of plurality of compacted stringer packages 244 has a curvature complementary to a unique location on cure tool 226. When each of plurality of compacted stringer packages 244 has a curvature complementary to a unique location, each of plurality of compacted stringer packages 244 has its own respective forming and cure mandrel and its own respective rigid base.

In these illustrative examples, forming plurality of compacted stringer packages 244 comprises placing a plurality of composite charges each over a respective forming and cure mandrel, a respective first radius filler, and a respective second radius filler. Each respective forming and cure mandrel has a complementary curvature to a respective rigid base.

The illustration of manufacturing environment 200 in FIG. 2 is not meant to imply physical or architectural limitations to the manner in which an illustrative embodiment may be implemented. Other components in addition to, or in place of, the ones illustrated may be used. Some components may be unnecessary. Also, the blocks are presented to illustrate some functional components. One or more of these blocks may be combined, divided, or combined and divided into different blocks when implemented in an illustrative embodiment.

For example, respective forming and cure mandrels for each of plurality of compacted stringer packages 244 are not depicted. Additionally, optional plies, inner ply 216 and composite ply 220, are both depicted in FIG. 2. In some illustrative examples, one or both of inner ply 216 and composite ply 220 are not present.

As another example, although not depicted in FIG. 2, manufacturing environment 200 may include a number of carriers, a number of shuttles, or other composite ply movement and placement equipment. As used herein, "a number of" is one or more items. For example, "a number of carriers" is one or more carriers. In some illustrative examples, at least one of composite charge 204, composite ply 220, inner ply 216, first radius filler 207, or second radius filler 208 may be moved and placed using equipment. In other illustrative examples, at least one of composite charge 204, composite ply 220, inner ply 216, first radius filler 207, or second radius filler 208 may be moved or placed by hand.

As yet another example, although not depicted in FIG. 2, manufacturing environment 200 may include movement equipment for moving compacted stringer package 202. In some illustrative examples, the movement equipment may move and place compacted stringer package 202 onto cure tool 226. In other illustrative examples, compacted stringer package 202 may be placed onto cure tool 226 by hand.

As a further example, although not depicted in FIG. 2, heating equipment may be present in manufacturing environment 200. In some illustrative examples, stringer layup 232 is heated while the vacuum pressure is applied to stringer layup 232 to form compacted stringer package 202 having hat-shaped cross-section 234. Heat may be applied using any desirable form of heating equipment. Heating of stringer layup 232 causes the composite material in stringer layup 232 to become more pliable than at room temperature. By heating stringer layup 232 while forming compacted stringer package 202, fewer inconsistencies may be present in compacted stringer package 202.

Figure 3:
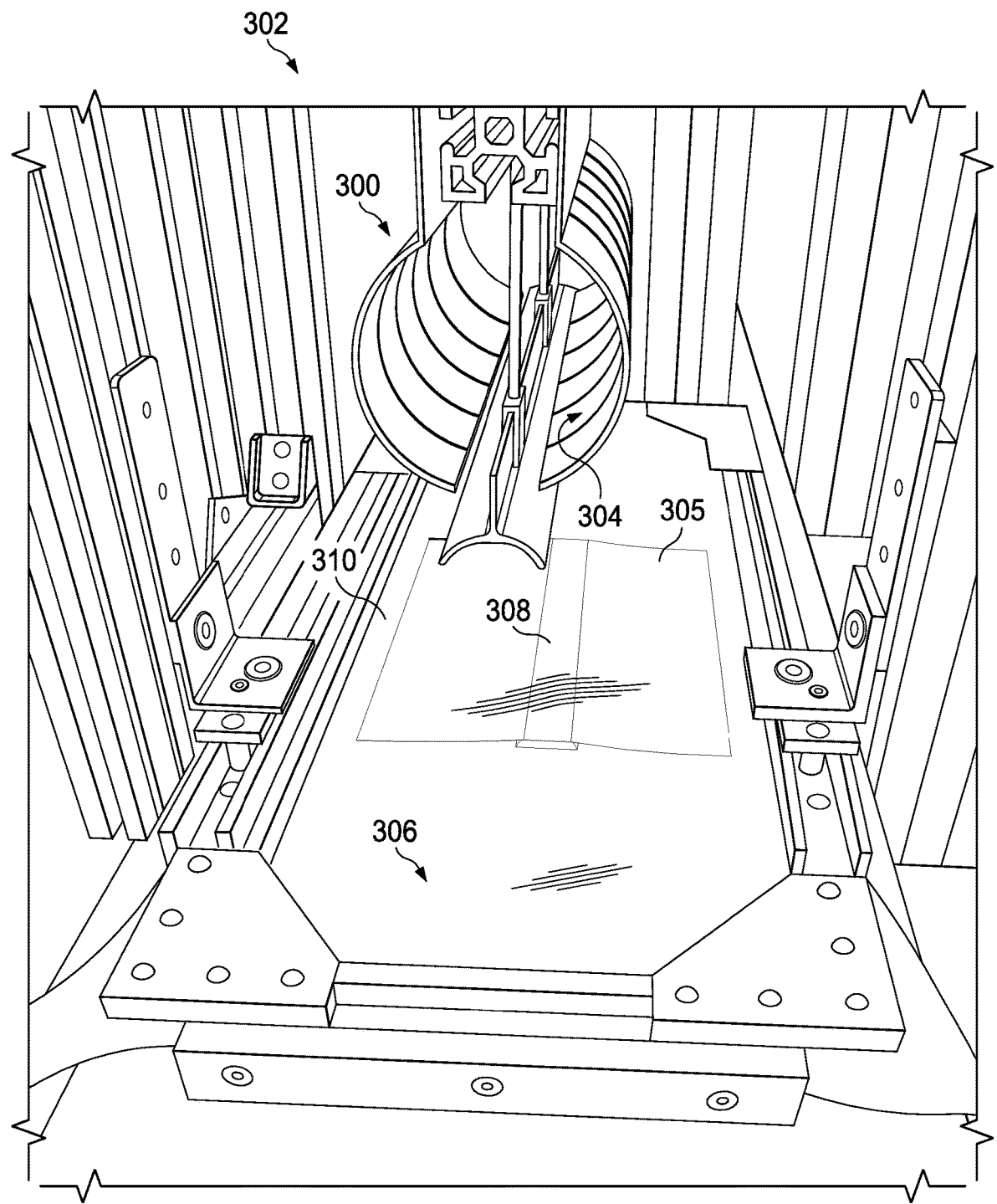
FIG. 3 is an illustration of a mechanical shaping tool in a manufacturing environment in accordance with an illustrative embodiment.

Turning now to FIG. 3, an illustration of a mechanical shaping tool in a manufacturing environment is depicted in accordance with an illustrative embodiment. Mechanical shaping tool 300 in manufacturing environment 302 is a physical implementation of mechanical shaping tool 240 of FIG. 2.

Mechanical shaping tool 300 includes plurality of mechanical fingers 304 that slide across composite charge 305 on rigid base 306. Mechanical fingers 304 may have any desirable shape and be actuated by any desirable force. As depicted, composite charge 305 and forming and cure mandrel 308 are present between rigid base 306 and vacuum bag 310. Forming and cure mandrel 308 is present to shape composite charge 305 on rigid base 306.

Figure 4:
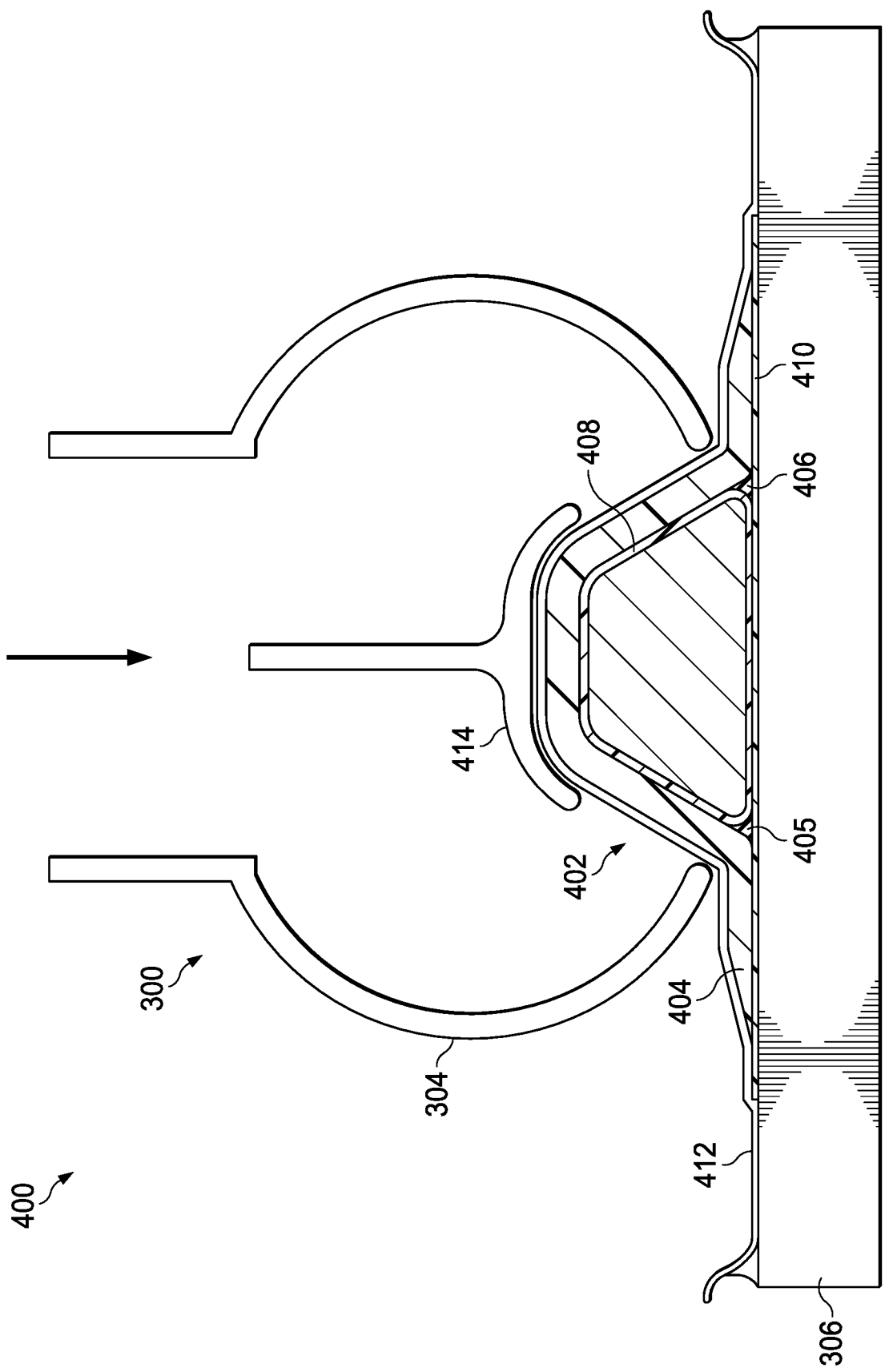
FIG. 4 is an illustration of a stringer layup in a mechanical shaping tool in accordance with an illustrative embodiment.

Turning now to FIG. 4, an illustration of a stringer layup in a mechanical shaping tool is depicted in accordance with an illustrative embodiment. View 400 is an illustration of mechanical shaping tool 300 while compacting stringer layup 402. Stringer layup 402 includes composite charge 404, first radius filler 405, second radius filler 406, wrap ply 408, and inner ply 410. Although both wrap ply 408 and inner ply 410 are present in stringer layup 402, wrap ply 408 and inner ply 410 are both optional.

As depicted, plurality of mechanical fingers 304 slide across composite charge 404 on rigid base 306. Plurality of mechanical fingers 304 applies mechanical pressure to composite charge 404 to shape and compact composite charge 404.

Vacuum pressure is applied to stringer layup 402 under vacuum bag 412. The vacuum pressure and the mechanical pressure may be substantially simultaneously applied. In some illustrative examples, the vacuum pressure may remain on stringer layup 402 longer than the mechanical pressure.

The illustrations of mechanical shaping tool 300 in FIGS. 3 and 4 are not meant to imply physical or architectural limitations to the manner in which an illustrative embodiment may be implemented. Mechanical shaping tool 300 is only one physical implementation of mechanical shaping tool 240 of FIG. 2. For example, mechanical shaping tool 300 may have any desirable number and shape of mechanical fingers.

In some illustrative examples, cap forming portion 414 of mechanical shaping tool 300 may have a different shape. In some illustrative examples, mechanical shaping tool 240 may include a diaphragm or inflatable bladder to apply the mechanical pressure to stringer layup 402.

Turning now to FIG. 5, an illustration of components of a composite stringer package prior to compacting is depicted in accordance with an illustrative embodiment. Composite charge 500 is a physical implementation of composite charge 204 of FIG. 2. Composite charge 500 is placed over forming and cure mandrel 502, first radius filler 503, and second radius filler 504. Forming and cure mandrel 502 is a physical implementation of forming and cure mandrel 210 of FIG. 2. First radius filler 503 and second radius filler 504 are physical implementations of first radius filler 207 and second radius filler 208 of FIG. 2.

As depicted, composite ply 506 is wrapped around forming and cure mandrel 502. Composite ply 506 is a physical implementation of composite ply 220 of FIG. 2. By placing composite charge 500 over forming and cure mandrel 502, composite charge 500 is positioned such that composite charge 500 contacts composite ply 506.

Inner ply 508 is positioned on rigid base 510. Inner ply 508 is a physical implementation of inner ply 216 of FIG. 2. Rigid base 510 is a physical implementation of rigid base 230 of FIG. 2.

In FIG. 5, mechanical pressure and vacuum pressure have not yet been applied. In FIG. 5, the components are not compacted.

Turning now to FIG. 6, an illustration of a compacted stringer package is depicted in accordance with an illustrative embodiment. Compacted stringer package 600 is a compacted structure formed of components shown in FIG. 5.

Compacted stringer package 600 includes composite charge 500, forming and cure mandrel 502, first radius filler 503, second radius filler 504, composite ply 506, and inner ply 508. Compacted stringer package 600 is sufficiently rigid to transport compacted stringer package 600 without rigid base 510. Compacted stringer package 600 may be picked up as a whole and placed into a cure tool (not depicted) as a whole.

Compacted stringer package 600 has hat-shaped cross-section 602. Hat-shaped cross-section 602 includes cap 604, first web 605, second web 606, first flange 607, second flange 608, and bottom 610. As depicted, composite ply 506 and inner ply 508 form a portion of bottom 610 of hat-shaped cross-section 602 connecting first flange 607 and second flange 608.

Turning now to FIG. 7, an illustration of components of a composite stringer package prior to compacting is depicted in accordance with an illustrative embodiment. Composite charge 700 is a physical implementation of composite charge 204 of FIG. 2. Composite charge 700 is placed over forming and cure mandrel 702, first radius filler 703, and second radius filler 704. Forming and cure mandrel 702 is a physical implementation of forming and cure mandrel 210 of FIG. 2. First radius filler 703 and second radius filler 704 are a physical implementation of first radius filler 207 and second radius filler 208 of FIG. 2.

As depicted, composite ply 706 is wrapped around forming and cure mandrel 702. Composite ply 706 is a physical implementation of composite ply 220 of FIG. 2. By placing composite charge 700 over forming and cure mandrel 702, composite charge 700 is positioned such that composite charge 700 contacts composite ply 706.

First radius filler 703, second radius filler 704, and a portion of composite ply 706 each contact rigid base 708. Rigid base 708 is a physical implementation of rigid base 230 of FIG. 2.

In FIG. 7, mechanical pressure and vacuum pressure have not yet been applied. In FIG. 7, the components are not compacted.

Turning now to FIG. 8, an illustration of a compacted stringer package is depicted in accordance with an illustrative embodiment. Compacted stringer package 800 is a compacted structure formed of components shown in FIG. 7.

Compacted stringer package 800 includes composite charge 700, forming and cure mandrel 702, first radius filler 703, second radius filler 704, and composite ply 706. Compacted stringer package 800 is sufficiently rigid to transport compacted stringer package 800 without rigid base 708. Compacted stringer package 800 may be picked up as a whole and placed into a cure tool (not depicted) as a whole.

Compacted stringer package 800 has hat-shaped cross-section 802. Hat-shaped cross-section 802 includes cap 804, first web 805, second web 806, first flange 807 and second flange 808.

Turning now to FIG. 9, an illustration of components of a composite stringer package prior to compacting is depicted in accordance with an illustrative embodiment. Composite charge 900 is a physical implementation of composite charge 204 of FIG. 2. Composite charge 900 is placed over forming and cure mandrel 902, first radius filler 903, and second radius filler 904. Forming and cure mandrel 902 is a physical implementation of forming and cure mandrel 210 of FIG. 2. First radius filler 903 and second radius filler 904 are physical implementations of first radius filler 207 and second radius filler 208 of FIG. 2.

As depicted, inner ply 906 is positioned on rigid base 908. Inner ply 906 is a physical implementation of inner ply 216 of FIG. 2. Rigid base 908 is a physical implementation of rigid base 230 of FIG. 2.

In FIG. 9, mechanical pressure and vacuum pressure have not yet been applied. In FIG. 9, the components are not compacted.

Turning now to FIG. 10, an illustration of a compacted stringer package is depicted in accordance with an illustrative embodiment. Compacted stringer package 1000 is a compacted structure formed of components shown in FIG. 9.

Compacted stringer package 1000 includes composite charge 900, forming and cure mandrel 902, first radius filler 903, second radius filler 904, and inner ply 906. Compacted stringer package 1000 is sufficiently rigid to transport compacted stringer package 1000 without rigid base 908. Compacted stringer package 1000 may be picked up as a whole and placed into a cure tool (not depicted) as a whole.

Compacted stringer package 1000 has hat-shaped cross-section 1002. Hat-shaped cross-section 1002 includes cap 1004, first web 1005, second web 1006, first flange 1007, second flange 1008, and bottom 1010. As depicted, inner ply 906 forms a portion of bottom 1010 of hat-shaped cross-section 1002 connecting first flange 1007 and second flange 1008.

Figure 11:
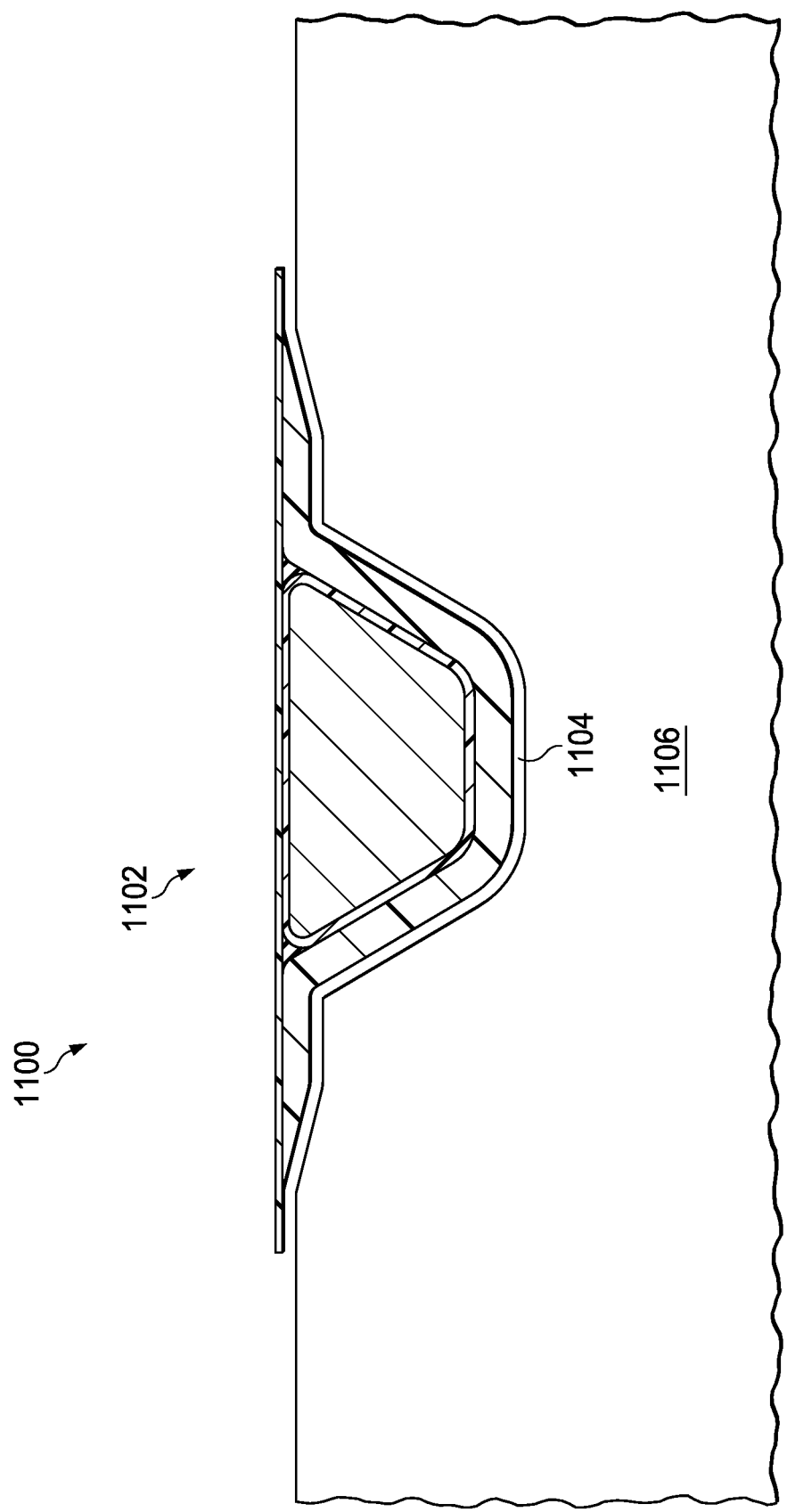
FIG. 11 is an illustration of a compacted stringer package placed onto a cure tool in accordance with an illustrative embodiment.

Turning now to FIG. 11, an illustration of a compacted stringer package placed onto a cure tool is depicted in accordance with an illustrative embodiment. In view 1100, compacted stringer package 1102 is placed into hollow 1104 of cure tool 1106. Hollow 1104 is a unique location of cure tool 1106. Compacted stringer package 1102 is designed to fit within hollow 1104. Compacted stringer package 1102 is complementary to any curvatures of hollow 1104.

After placing all desired compacted stringer packages onto cure tool 1106, a composite skin is placed over the compacted stringer packages. The composite skin and desired compacted stringer packages will then be co-cured on cure tool 1106.

Although compacted stringer package 1102 has a layup similar to compacted stringer package 600 of FIG. 6, compacted stringer package 1102 may have any desirable layup. For example, compacted stringer package 1102 may have a layup like compacted stringer package 800 of FIG. 8. In another example, compacted stringer package 1102 has a layup like compacted stringer package 1000 of FIG. 10.

Figure 12:
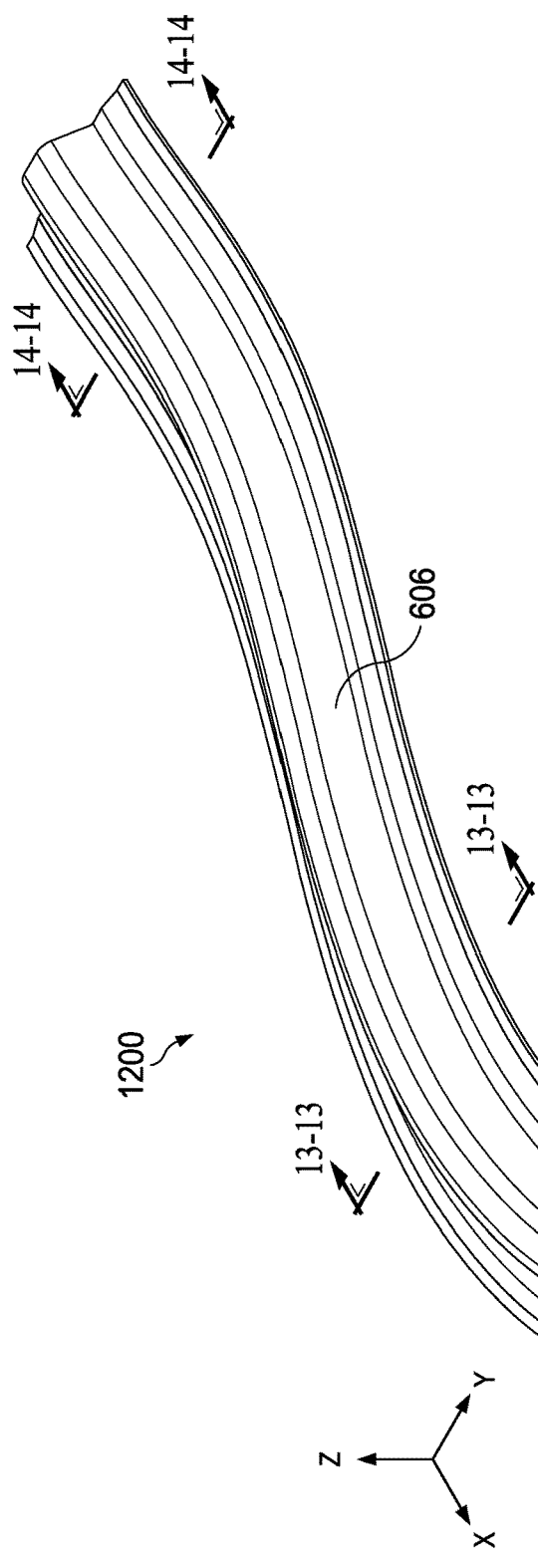
FIG. 12 is an illustration of a perspective view of a compacted stringer package having complex contours in accordance with an illustrative embodiment.

Turning now to FIG. 12, an illustration of a perspective view of a compacted stringer package having complex contours is depicted in accordance with an illustrative embodiment. View 1200 is a perspective view of compacted stringer package 600 of FIG. 6. Compacted stringer package 600 is a physical implementation of compacted stringer package 202 of FIG. 2. In view 1200, complex curvature of compacted stringer package 600 is visible.

Compacted stringer package 600 may have a number of complex contours along its length. The contours of compacted stringer package 600 may be constant or varying. As depicted, compacted stringer package 600 has curvatures in the X-Y plane and curvatures in the X-Z plane. Compacted stringer package 600 is also twisted. Compacted stringer package 600 may be twisted at a constant or varying angle θ.

Figure 14:
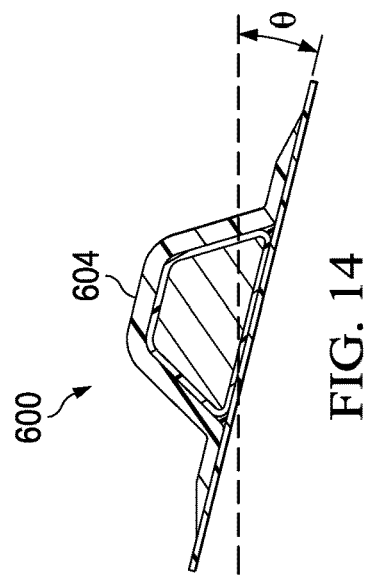
FIG. 14 is an illustration of a cross-sectional view of a compacted stringer package having complex contours in accordance with an illustrative embodiment.
Figure 13:
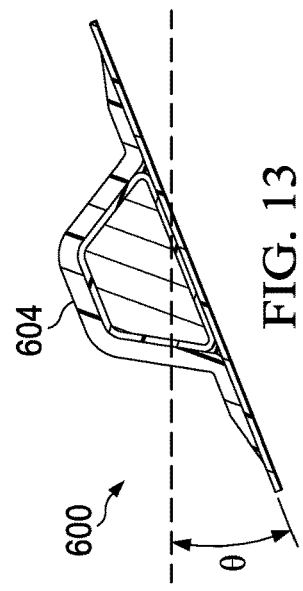
FIG. 13 is an illustration of a cross-sectional view of a compacted stringer package having complex contours in accordance with an illustrative embodiment.

Turning now to FIGS. 13 and 14, illustrations of cross-sectional views of a compacted stringer package having complex contours are depicted in accordance with an illustrative embodiment. Twists of compacted stringer package 600 within Y-Z plane are depicted in FIGS. 13 and 14.

Figure 15:
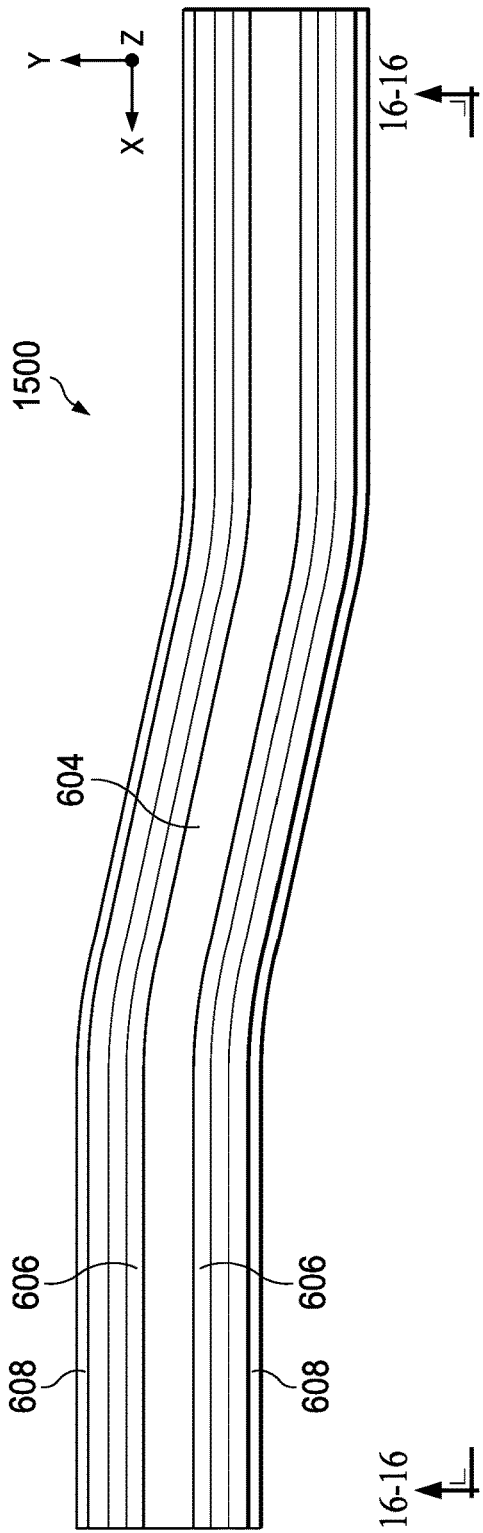
FIG. 15 is an illustration of a top view of a compacted stringer package having complex contours in accordance with an illustrative embodiment.

Turning now to FIG. 15, an illustration of a top view of a compacted stringer package having complex contours is depicted in accordance with an illustrative embodiment. View 1500 is a top view of compacted stringer package 600 depicting curvature in the X-Y plane.

Figure 16:
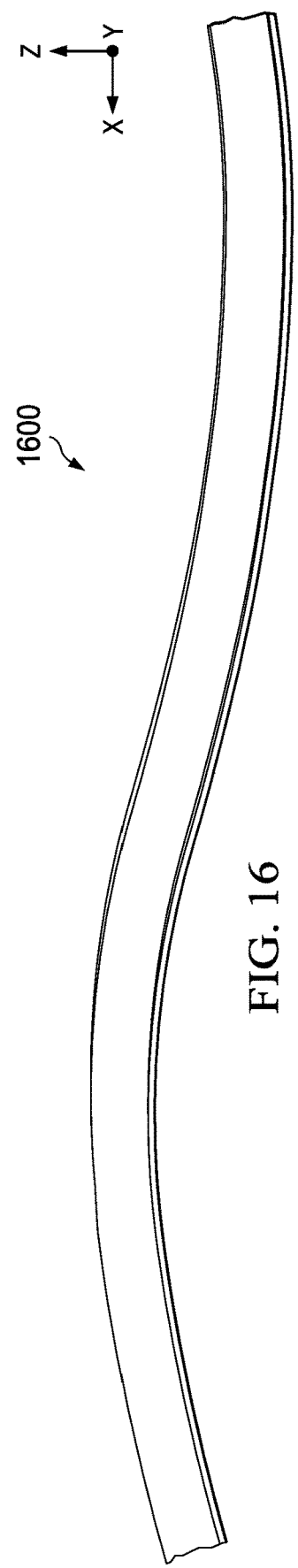
FIG. 16 is an illustration of a side view of a compacted stringer package having complex contours in accordance with an illustrative embodiment.

Turning now to FIG. 16, an illustration of a side view of a compacted stringer package having complex contours is depicted in accordance with an illustrative embodiment. View 1600 is a side view of compacted stringer package 600 depicting curvature in the X-Z plane.

The different components shown in FIGS. 1 and 3-16 may be combined with components in FIG. 2, used with components in FIG. 2, or a combination of the two. Additionally, some of the components in FIGS. 1 and 3-16 may be illustrative examples of how components shown in block form in FIG. 2 can be implemented as physical structures.

Figure 17:
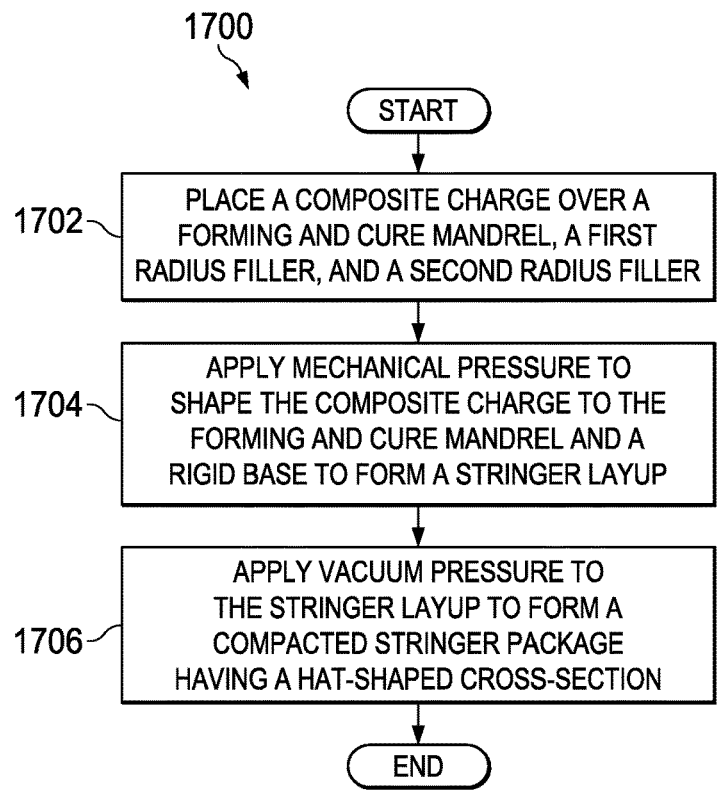
FIG. 17 is an illustration of a flowchart of a method for forming a compacted stringer package in accordance with an illustrative embodiment.

Turning now to FIG. 17, an illustration of a flowchart of a method for forming a compacted stringer package is depicted in accordance with an illustrative embodiment. Method 1700 may be used to form any of compacted stringer package 202 of FIG. 2, compacted stringer package 600 of FIGS. 6 and 12-16, compacted stringer package 800 of FIG. 8, or compacted stringer package 1000 of FIG. 10.

Method 1700 places a composite charge over a forming and cure mandrel, a first radius filler, and a second radius filler (operation 1702). Method 1700 applies mechanical pressure to shape the composite charge to the forming and cure mandrel and a rigid base to form a stringer layup (operation 1704). In some illustrative examples, applying the mechanical pressure comprises pressing the composite charge using a plurality of mechanical fingers by sliding the plurality of mechanical fingers across the composite charge.

Method 1700 applies vacuum pressure to the stringer layup to form a compacted stringer package having a hat-shaped cross-section (operation 1706). In some illustrative examples, the mechanical pressure and the vacuum pressure are applied substantially simultaneously. Afterwards, the process terminates.

In some illustrative examples, the hat-shaped cross-section comprises a cap, a first web, and a second web, shaped by the forming and cure mandrel. In some illustrative examples, the hat-shaped cross-section further comprises a first flange, and a second flange, shaped by the rigid base. In some illustrative examples, the hat-shaped cross-section further comprises a bottom connecting a first flange and a second flange and extending underneath the cap, the first web, and the second web.

Figure 18:
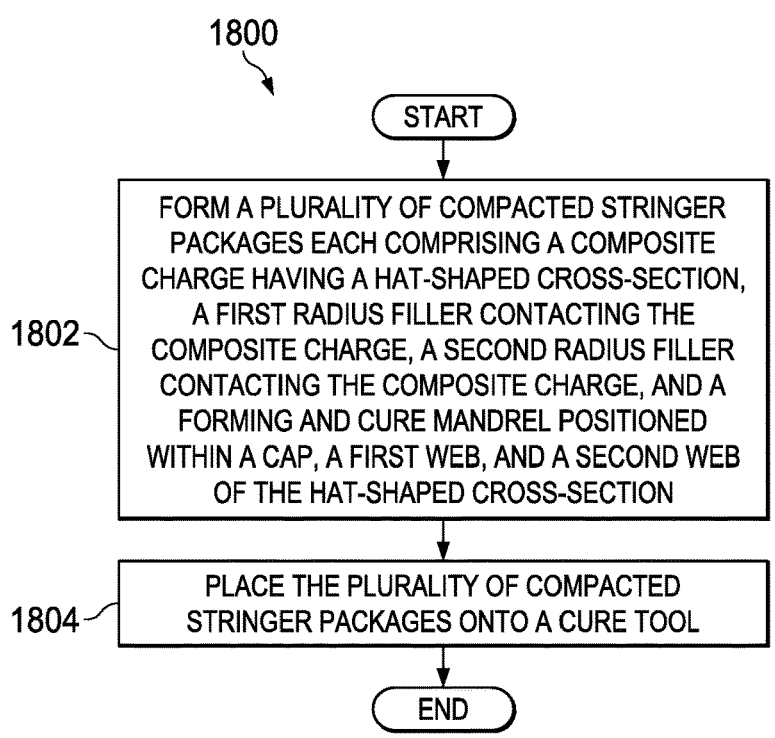
FIG. 18 is an illustration of a flowchart of a method for manufacturing using a plurality of compacted stringer packages in accordance with an illustrative embodiment.

Turning now to FIG. 18, an illustration of a flowchart of a method for manufacturing using a plurality of compacted stringer packages is depicted in accordance with an illustrative embodiment. Method 1800 may be performed using at least one of compacted stringer package 202 of FIG. 2, compacted stringer package 600 of FIGS. 6 and 12-16, compacted stringer package 800 of FIG. 8, or compacted stringer package 1000 of FIG. 10.

Method 1800 forms a plurality of compacted stringer packages each comprising a composite charge having a hat-shaped cross-section, a first radius filler contacting the composite charge, a second radius filler contacting the composite charge, and a forming and cure mandrel positioned within a cap, a first web, and a second web of the hat-shaped cross-section (operation 1802). In some illustrative examples, forming the plurality of compacted stringer packages comprises placing a plurality of composite charges each over a respective forming and cure mandrel, a respective first radius filler, and a respective second radius filler, applying mechanical pressure to shape each of the plurality of composite charges to the respective forming and cure mandrel and a respective rigid base to form stringer layups, and applying vacuum pressure to the stringer layups to form the plurality of compacted stringer packages each having the hat-shaped cross-section. In some of these illustrative examples, each respective forming and cure mandrel has a complementary curvature to a respective rigid base.

Method 1800 places the plurality of compacted stringer packages onto a cure tool (operation 1804). Afterwards, the process terminates. In some illustrative examples, each of the plurality of compacted stringer packages has a curvature complementary to a unique location on the cure tool. In some illustrative examples, one compacted stringer package is placed onto the cure tool at a time. In other illustrative examples, multiple compacted stringer packages are placed onto the cure tool at substantially the same time.

In some illustrative examples, the plurality of compacted stringer packages are placed onto the cure tool by a number of human operators. In other illustrative examples, the plurality of compacted stringer packages are placed onto the cure tool by a number of robots using automation.

The flowcharts and block diagrams in the different depicted illustrative embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the Figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

In some illustrative examples, method 1700 of FIG. 17 further comprises wrapping a composite ply around the forming and cure mandrel prior to placing the composite charge over the forming and cure mandrel, the first radius filler, and the second radius filler, such that at least one of applying the mechanical pressure to shape the composite charge or applying the vacuum pressure to the stringer layup adheres the composite charge to the composite ply. In some illustrative examples, method 1700 further comprises placing an inner ply onto the rigid base, placing the first radius filler and the second radius filler onto the inner ply on the rigid base, and placing the forming and cure mandrel onto the inner ply prior to placing the composite charge over the forming and cure mandrel.

In some illustrative examples, method 1700 further comprises removing the compacted stringer package from the rigid base, and placing the compacted stringer package into a cure tool. In an illustrative example, method 1700 additionally further comprises removing the forming and cure mandrel from the compacted stringer package. In yet another illustrative example, method 1800 of FIG. 18 further comprises removing a respective forming and cure mandrel from each of the plurality of compacted stringer packages.

The illustrative examples provide methods and apparatus for composite manufacturing with stringers having hat-shaped cross-sections. The illustrative examples form compacted stringer packages having hat-shaped cross-sections.

In the illustrative examples, a finger former device may be used to form pre-preg hat-shaped stringers directly onto the bladder/mandrel that provides the inside geometry of the stringer. Also included in the forming is the radius filler (noodle) that interfaces with the skin. These components create a package of the stringer, the bladder/mandrel, and the noodle that is ready for installation. The finger-forming technology allows the stringer package to be formed to engineering contour, so that the stringer will not bend (and wrinkle) during installation.

By assembling the stringer package on a feeder-line, the illustrative examples remove significant flow time in the critical path of a fuselage build. By forming to a contour, the stringer inspection can take place at the forming station rather than on the cure tool.

The illustrative examples allow flexibility to use automation in the stringer fabrication feeder-line and stringer installation line. It also moves significant work out of the critical flow path. Thus, the illustrative examples reduce composite fabrication flow time and allow process automation.

An illustrative example of the present disclosure provides a method. A composite charge is placed over a forming and cure mandrel, a first radius filler, and a second radius filler. Mechanical pressure is applied to shape the composite charge to the forming and cure mandrel and a rigid base to form a stringer layup. Vacuum pressure is applied to the stringer layup to form a compacted stringer package having a hat-shaped cross-section.

Another illustrative example of the present disclosure provides a method. A plurality of compacted stringer packages is formed, each comprising a composite charge having a hat-shaped cross-section, a first radius filler contacting the composite charge, a second radius filler contacting the composite charge, and a forming and cure mandrel positioned within a cap, a first web, and a second web of the hat-shaped cross-section. The plurality of compacted stringer packages is placed onto a cure tool.

A further illustrative example of the present disclosure provides a compacted stringer package. The compacted stringer package comprises a composite charge, a first radius filler, a second radius filler, and a forming and cure mandrel. The composite charge has a hat-shaped cross-section. The first radius filler contacts the composite charge. The second radius filler contacts the composite charge. The forming and cure mandrel is positioned within a cap, a first web, and a second web of the hat-shaped cross-section.

In one illustrative example, a method comprises placing a composite charge over a forming and cure mandrel, a first radius filler, and a second radius filler, applying mechanical pressure to shape the composite charge to the forming and cure mandrel and a rigid base to form a stringer layup, and applying vacuum pressure to the stringer layup to form a compacted stringer package having a hat-shaped cross-section. In some illustrative examples of the method, the hat-shaped cross-section comprises a cap, a first web, and a second web shaped by the forming and cure mandrel, and wherein the hat-shaped cross-section further comprises a first flange and a second flange shaped by the rigid base. In some illustrative examples of the method, the hat-shaped cross-section further comprises a bottom connecting the first flange and the second flange and extending underneath the cap, the first web, and the second web.

In some illustrative examples, the method further comprises wrapping a composite ply around the forming and cure mandrel prior to placing the composite charge over the forming and cure mandrel, the first radius filler, and the second radius filler such that at least one of applying the mechanical pressure to shape the composite charge or applying the vacuum pressure to the stringer layup adheres the composite charge to the composite ply. In some illustrative examples, the method further comprises placing an inner ply onto the rigid base, placing the first radius filler and the second radius filler onto the inner ply on the rigid base, and placing the forming and cure mandrel onto the inner ply prior to placing the composite charge over the forming and cure mandrel.

In some illustrative examples, in the method, the mechanical pressure and the vacuum pressure are applied substantially simultaneously. In some illustrative examples, the method further comprises removing the compacted stringer package from the rigid base, and placing the compacted stringer package into a cure tool. In some illustrative examples, the method yet further comprises removing the forming and cure mandrel from the compacted stringer package.

In some illustrative examples, in the method, the forming and cure mandrel and the rigid base have complementing curvatures. In some illustrative examples, in the method, applying mechanical pressure comprises pressing the composite charge using a plurality of mechanical fingers by sliding the plurality of mechanical fingers across the composite charge.

In one illustrative example, a method comprises forming a plurality of compacted stringer packages each comprising a composite charge having a hat-shaped cross-section, a first radius filler contacting the composite charge, a second radius filler contacting the composite charge, and a forming and cure mandrel positioned within a cap, a first web, and a second web of the hat-shaped cross-section, and placing the plurality of compacted stringer packages onto a cure tool.

In some illustrative examples, in the method, each of the plurality of compacted stringer packages has a curvature complementary to a unique location on the cure tool. In some illustrative examples, in the method, forming the plurality of compacted stringer packages comprises: placing a plurality of composite charges each over a respective forming and cure mandrel, respective first radius filler, and respective second radius filler, applying mechanical pressure to shape each of the plurality of composite charges to the respective forming and cure mandrel and a respective rigid base to form stringer layups each having a hat-shaped cross-section, and applying vacuum pressure to the stringer layups to form the plurality of compacted stringer packages. In some illustrative examples, the method further comprises removing a respective forming and cure mandrel from each of the plurality of compacted stringer packages.

In another illustrative example, a compacted stringer package comprises a composite charge having a hat-shaped cross-section; a first radius filler contacting the composite charge; a second radius filler contacting the composite charge; and a forming and cure mandrel positioned within a cap, a first web, and a second web of the hat-shaped cross-section.

In some examples, the compacted stringer package further comprises an inner ply connecting a first flange and a second flange of the hat-shaped cross-section and contacting the first radius filler and the second radius filler. In some examples, the compacted stringer package further comprises a composite ply wrapped around the forming and cure mandrel.

In some examples, in the compacted stringer package, the forming and cure mandrel comprises at least one of a collapsible mandrel, a dissolvable material, a solid mandrel, or an inflatable bladder. In some examples, in the compacted stringer package, the forming and cure mandrel has a curvature in at least one of an X-Y axis, X-Z axis, or Y-Z axis. In some examples, in the compacted stringer package, the forming and cure mandrel is configured to function as a curing bladder.

Figure 19:
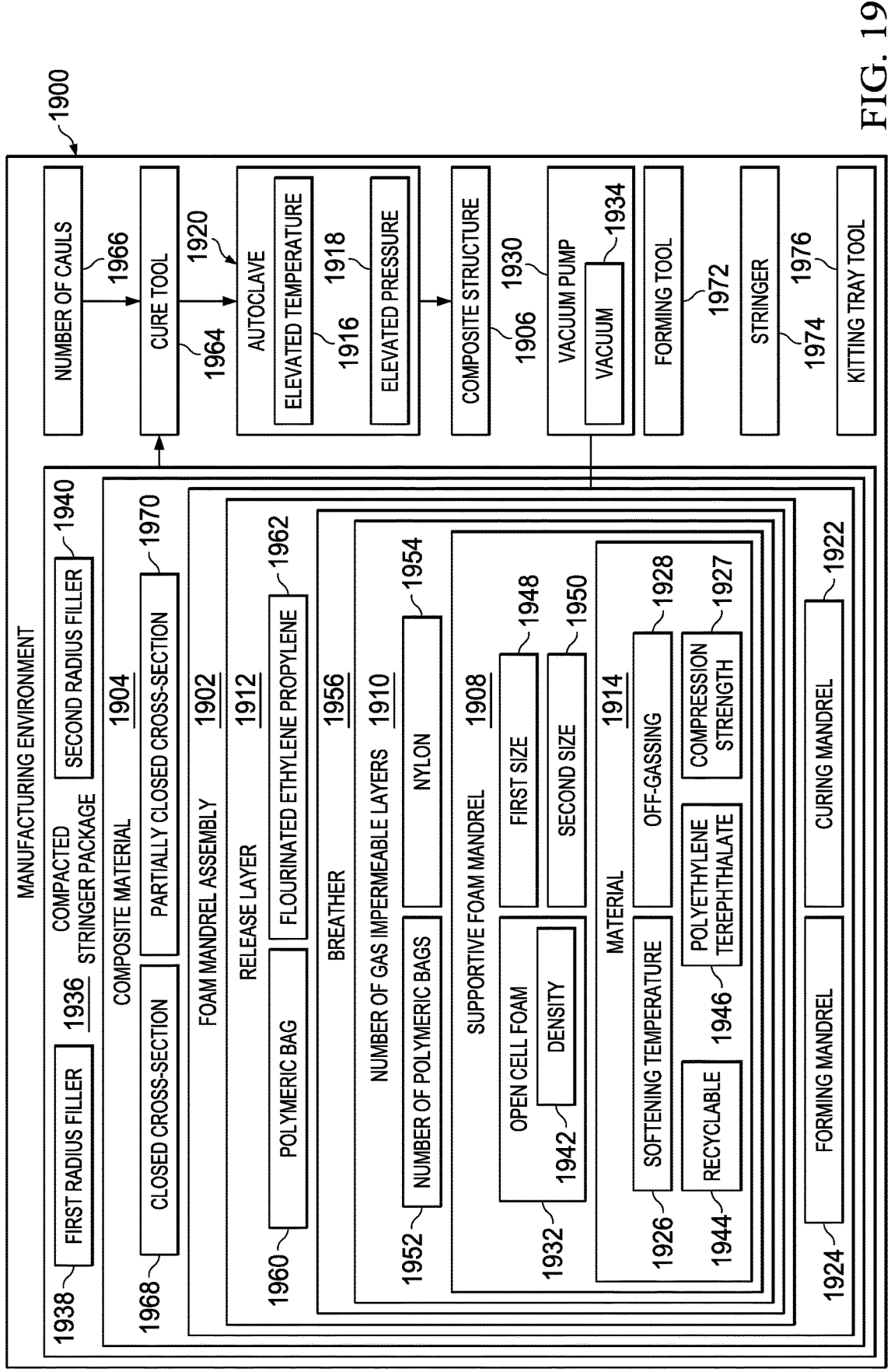
FIG. 19 is an illustration of a block diagram of a manufacturing environment in accordance with an illustrative embodiment.

Turning now to FIG. 19, an illustration of a block diagram of a manufacturing environment is depicted in accordance with an illustrative embodiment. Components of aircraft 100 of FIG. 1 may be formed in manufacturing environment 1900. For example, stiffeners 120 of FIG. 1 of aircraft 100 are cured in manufacturing environment 200.

Manufacturing environment 1900 includes foam mandrel assembly 1902 to be used in curing composite material 1904 to form composite structure 1906. Foam mandrel assembly 1902 comprises supportive foam mandrel 1908, number of gas impermeable layers 1910 surrounding supportive foam mandrel 1908, and release layer 1912 surrounding number of gas impermeable layers 1910. Number of gas impermeable layers 1910 encapsulate supportive foam mandrel 1908. Supportive foam mandrel 1908 comprises material 1914 configured to collapse under at least one of elevated temperature 1916 or elevated pressure 1918. In some illustrative examples, supportive foam mandrel 1908 comprises material 1914 configured to collapse under elevated temperature 1916 and elevated pressure 1918 of autoclave 1920 without chemical decomposition.

Foam mandrel assembly 1902 acts as curing mandrel 1922. Foam mandrel assembly 1902 provides support to composite material 1904 during curing. In some illustrative examples, Foam mandrel assembly 1902 provides support to composite material 1904 during curing in autoclave 1920.

In some illustrative examples, foam mandrel assembly 1902 also acts as forming mandrel 1924. When foam mandrel assembly 1902 acts as forming mandrel 1924, at least a portion of composite material 1904 is laid up on foam mandrel assembly 1902. When foam mandrel assembly 1902 acts as forming mandrel 1924, foam mandrel assembly 1902 shapes at least a portion of composite material 1904.

In foam mandrel assembly 1902, release layer 1912 does not have inherent structure to hold shape and oppose forces during layup of composite material 1904. When foam mandrel assembly 1902 is forming mandrel 1924, supportive foam mandrel 1908 acts as a secondary support structure inside release layer 1912 during layup of composite material 1904. Supportive foam mandrel 1908 acts as a secondary support structure inside release layer 1912 during at least a portion of curing composite material 1904.

Material 1914 is selected so that supportive foam mandrel 1908 is rigid at room temperature. Material 1914 is selected such that material 1914 of supportive foam mandrel 1908 collapses during cure of composite material 1904 due to at least one of elevated temperature 1916 or elevated pressure 1918. In some illustrative examples, material 1914 is selected such that material 1914 of supportive foam mandrel 1908 collapses during cure of composite material 1904 in autoclave 1920 due to elevated temperature 1916 and elevated pressure 1918.

Material 1914 is selected to soften at a temperature above a pressure differential temperature at which pressure differentials within the part being cured are substantially equalized. Material 1914 is selected to soften at a temperature higher than a temperature at which the viscosity of a resin of composite material 1904 is at a minimum. Material 1914 is selected such that material 1914 softens at a temperature below a maximum temperature of the cure cycle. In some illustrative examples, material 1914 is selected to soften within the range of 100 degrees Fahrenheit and 350 degrees Fahrenheit. In some illustrative examples, material 1914 is selected to soften within the range of 120 degrees Fahrenheit and 300 degrees Fahrenheit. In some illustrative examples, material 1914 is selected to soften within the range of 150 degrees Fahrenheit and 300 degrees Fahrenheit. In some illustrative examples, softening temperature 1926 is selected based on a curing temperature of composite material 1904. In some illustrative examples, softening temperature 1926 is selected based on pressure to be provided to composite material 1904 during curing.

Material 1914 is elected to provide compression strength 1927 at ambient temperature. Compression strength 1927 may have any desirable value depending on composite material 1904. In some illustrative examples, material 1914 is selected to provide compression strength of greater than 100 psi compression strength.

Material 1914 is selected to avoid undesirable off-gassing. Material 1914 is selected such that off-gassing 1928 does not undesirably affect equipment or personnel in manufacturing environment 1900. In some illustrative examples, material 1914 is selected such that off-gassing 1928 does not undesirably affect vacuum pump 1930. In these illustrative examples, material 1914 is selected to avoid undesirable impact to vacuum pump 1930.

In some illustrative examples, supportive foam mandrel 1908 is open cell foam 1932. In open cell foam 1932, the cell walls of open cell foam 1932 itself are connected or "open" to pass air from one cell to the next.

When supportive foam mandrel 1908 is open cell foam 1932, collapsing of supportive foam mandrel 1908 may be controlled by application of vacuum 1934 to open cell foam 1932. Application of vacuum 1934 to open cell foam 1932 collapses open cell foam 1932. The timing of the application of vacuum 1934 during curing of composite material 1904 impacts the resulting characteristics of composite structure 1906.

For example, when composite material 1904 is part of compacted stringer package 1936, supportive foam mandrel 1908 desirably remains rigid until pressure equalizes in the resin area. By remaining rigid, supportive foam mandrel 1908 controls the shape of compacted stringer package 1936.

In these illustrative examples, vacuum 1934 may be applied so that supportive foam mandrel 1908 collapses after the pressure equalizes in the resin area. For example, vacuum 1934 is applied to supportive foam mandrel 1908 after pressure equalizes in first radius filler 1938 and second radius filler 1940. By applying vacuum 1934 to supportive foam mandrel 1908, the timing of collapse of supportive foam mandrel 1908 is controlled.

Density 1942 of open cell foam 1932 affects at least one of the weight or the structural support of foam mandrel assembly 1902. In some illustrative examples, open cell foam 1932 has density 1942 in the range of 1 pounds per cubic inch to 16 pounds per cubic inch. In some illustrative examples, open cell foam 1932 has density 1942 in the range of 2 pounds per cubic inch to 8 pounds per cubic inch. In some illustrative examples, density 1942 of open cell foam 1932 is selected to provide a desirable structural support for composite material 1904. Density 1942 may be selected based on a shape, a type of material, a weight, or other characteristics of composite material 1904.

Density 1942 of open cell foam 1932 affects the weight of foam mandrel assembly 1902. In some illustrative examples, density 1942 of open cell foam 1932 is selected to reduce the weight of foam mandrel assembly 1902. In some illustrative examples, density 1942 of open cell foam 1932 is selected to allow for transport of foam mandrel assembly 1902.

The weight of foam mandrel assembly 1902 affects movement of foam mandrel assembly 1902 relative to composite material 1904. Increasing the weight of foam mandrel assembly 1902 increases the chance of foam mandrel assembly 1902 moving within composite material 1904 when composite material 1904 is angled or positioned upside down.

Conventional reinforced bladders have added weight from the reinforcement. In some illustrative examples, foam mandrel assembly 1902 desirably weighs less than a conventional reinforced bladder. In some illustrative examples, density of open cell foam 1932 is selected such that foam mandrel assembly 1902 weighs less than a conventional reinforced bladder.

Supportive foam mandrel 1908 may be formed of any desirable material 1914. Material 1914 is selected based on softening temperature 1926, off-gassing 1928, reactivity, weight, cost, or any other desirable characteristic.

In one illustrative example, material 1914 is selected to be recyclable 1944. When material 1914 is recyclable 1944, although supportive foam mandrel 1908 is a single use item, material 1914 may be reused after collapse.

In some illustrative examples, material 1914 may be selected from any desirable polymeric material providing the desirable material characteristics. In one illustrative example, material 1914 is polyethylene terephthalate 1946. In another illustrative example, material 1914 is polyphenylsulfone. In yet another illustrative example, material 1914 is polymethacrylimide.

Prior to collapsing, supportive foam mandrel 1908 is first size 1948. Prior to being placed into an oven 1949 or autoclave 1920, supportive foam mandrel 1908 is first size 1948. After collapsing, supportive foam mandrel 1908 is second size 1950. Second size 1950 is sufficiently small to allow for removal of foam mandrel assembly 1902 from composite structure 1906. Collapsing supportive foam mandrel 1908 comprises supportive foam mandrel 1908 going from first size 1948 to second size 1950 without chemically decomposing, wherein second size 1950 is smaller than first size 1948.

Number of gas impermeable layers 1910 surrounds supportive foam mandrel 1908. Number of gas impermeable layers 1910 contains vacuum 1934 when vacuum 1934 is drawn on supportive foam mandrel 1908.

Number of gas impermeable layers 1910 also contains material 1914 so that supportive foam mandrel 1908 does not pull into multiple pieces during collapsing. Number of gas impermeable layers 1910 contains material 1914 for ease of removal of supportive foam mandrel 1908 after collapsing.

Number of gas impermeable layers 1910 takes any desirable form. In some illustrative examples, number of gas impermeable layers 1910 is number of polymeric bags 1952. In one illustrative example, number of gas impermeable layers 1910 includes one polymeric bag. In another illustrative example, number of gas impermeable layers 1910 includes two polymeric bags.

Number of gas impermeable layers 1910 is formed of any desirable material. The material for number of gas impermeable layers 1910 may be selected based on any desirable characteristics. For example, material for number of gas impermeable layers 1910 may be selected based on at least one of cost, flexibility, reactivity, or any other desirable characteristic. In one illustrative example, number of gas impermeable layers 1910 is formed of nylon 1954.

As depicted, breather 1956 is positioned between number of gas impermeable layers 1910 and release layer 1912. When breather 1956 is present, number of gas impermeable layers 1910 does not cling to release layer 1912 due to vacuum 1934. Vacuum 1934 applied within number of gas impermeable layers 1910 pulls number of gas impermeable layers 1910 towards supportive foam mandrel 1908.

Release layer 1912 takes any desirable form. In some illustrative examples, release layer 1912 takes the form of polymeric bag 1960.

Release layer 1912 acts as a barrier to prevent resin of composite material 1904 from bonding to breather 956 or number of gas impermeable layers 1910. Release layer 1912 may be formed of any desirable material. In some illustrative examples, release layer 1912 is formed from fluorinated ethylene propylene 1962. Release layer 1912 is formed of any material that will act as a barrier as desired.

After forming compacted stringer package 1936 comprising foam mandrel assembly 1902, compacted stringer package 1936 is placed onto cure tool 1964. Number of cauls 1966 is placed over composite material 1904 on cure tool 1964. Composite material 1904 of compacted stringer package 1936 is cured at an elevated temperature to form composite structure 1906. In some illustrative examples, composite material of compacted stringer package 1936 is cured in autoclave 1920. In other illustrative examples, composite material of compacted stringer package 1936 is cured in oven 1949. Autoclave 1920 may provide both elevated temperature 1916 and elevated pressure 1918 during curing. Oven 1949 may provide only elevated temperature 1916 during curing. Supportive foam mandrel 1908 is collapsed within foam mandrel assembly 1902 during curing.

Foam mandrel assembly 1902 may be placed in compacted stringer package 1936 in a plurality of ways. In one illustrative example, a composite charge, such as composite charge 204 of FIG. 2, is placed over foam mandrel assembly 1902, first radius filler 1938, and second radius filler 1940. Mechanical pressure is applied to shape the composite charge to foam mandrel assembly 1902 and a rigid base, such as rigid base 230 of FIG. 2, to form a stringer layup. Vacuum pressure is applied to the stringer layup to form compacted stringer package 1936.

In another illustrative example, a stringer is formed onto a separate forming tool. The stringer is then transferred to a kitting tray tool. After removing the separate forming tool, foam mandrel assembly 1902, first radius filler 1938, and second radius filler 1940 are installed within the stringer to form compacted stringer package 1936.

In the illustrative examples, foam mandrel assembly 1902 is present within closed cross-section 1968 or partially closed cross-section 1970 of composite material 1904. Composite material 1904 having closed cross-section 1968 or partially closed cross-section 1970 is cured within autoclave 1920 to form composite structure 1906. Composite material 1904 is in contact with foam mandrel assembly 1902 when curing begins.

By assembling compacted stringer package 1936 separate from cure tool 1964, manufacturing time may be reduced. By assembling compacted stringer package 1936 separate from cure tool 1964, downtime for cure tool 1964 is reduced. By foam mandrel assembly 1902 being used as both forming mandrel 1924 and curing mandrel 1922, at least one of manufacturing time or manufacturing cost is reduced.

Removing foam mandrel assembly 1902 after cure of compacted stringer package 1936 is faster than removing conventional cure mandrels. Use of foam mandrel assembly 1902 may reduce manufacturing time by reducing the amount of time spent removing a mandrel from composite material 1904.

In some illustrative examples, foam mandrel assembly 1902 is forming mandrel 1924. In other illustrative examples, compacted stringer package 1936 is formed and cured using separate forming and curing mandrels.

In some illustrative examples, compacted stringer package 1936 is formed using forming tool 1972 and cured using separate foam mandrel assembly 1902 acting as curing mandrel 1922. In these illustrative examples, stringer 1974 is formed onto forming tool 1972. Stringer 1974 is transferred to kitting tray tool 1976. While on kitting tray tool 1976, foam mandrel assembly 1902, a first radius filler 1938, and second radius filler 1940 are installed within stringer 1974 to form compacted stringer package 1936.

The illustration of manufacturing environment 1900 in FIG. 19 is not meant to imply physical or architectural limitations to the manner in which an illustrative embodiment may be implemented. Other components in addition to, or in place of, the ones illustrated may be used. Some components may be unnecessary. Also, the blocks are presented to illustrate some functional components. One or more of these blocks may be combined, divided, or combined and divided into different blocks when implemented in an illustrative embodiment.

For example, compacted stringer package 1936 may be one of a plurality of compacted stringer packages. Each of the plurality of compacted stringer packages may be placed within cure tool 1964 and co-cured.

Additionally, the different components shown in FIG. 19 may be combined with components in FIGS. 1-18, used with components in FIGS. 1-18, or a combination of the two. The blocks may be combined with blocks of other block diagrams. The different components shown in FIG. 19 may be combined with components in FIG. 2, used with components in FIG. 2, or a combination of the two.

Figure 20:
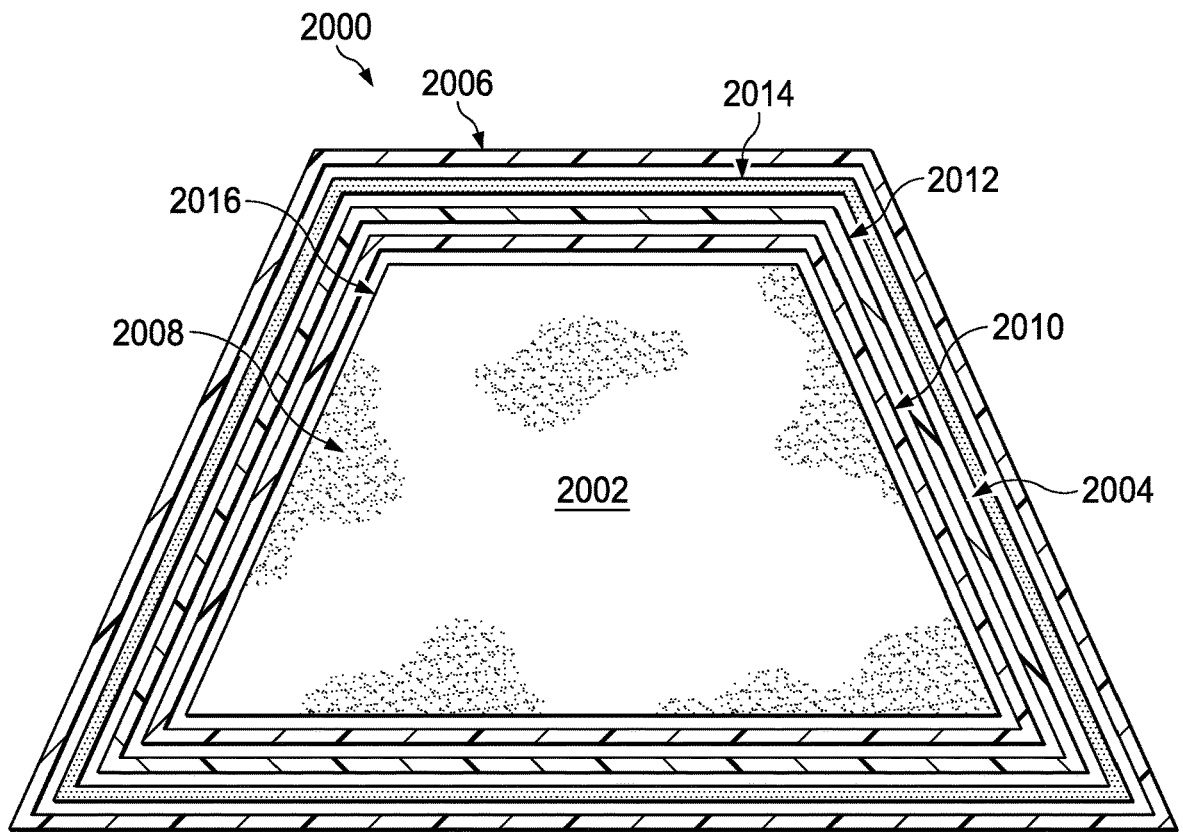
FIG. 20 is an illustration of a cross-sectional view of a foam mandrel assembly in accordance with an illustrative embodiment.

Turning now to FIG. 20, an illustration of a cross-sectional view of a foam mandrel assembly is depicted in accordance with an illustrative embodiment. Foam mandrel assembly 2000 is a physical implementation of foam mandrel assembly 1902 of FIG. 19. Foam mandrel assembly 2000 may be a physical implementation of forming and cure mandrel 210 of FIG. 2. In some illustrative examples, foam mandrel assembly 2000 may replace forming and cure mandrel 502 in FIG. 5, forming and cure mandrel 702 in FIG. 7, or forming and cure mandrel 902 in FIG. 9.

Foam mandrel assembly 2000 comprises supportive foam mandrel 2002, number of gas impermeable layers 2004, and release layer 2006. Supportive foam mandrel 2002 comprises material 2008 configured to collapse under elevated temperature and elevated pressure of an autoclave without chemical decomposition. Number of gas impermeable layers 2004 surrounds supportive foam mandrel 2002. Release layer 2006 surrounds number of gas impermeable layers 2004.

As depicted, number of gas impermeable layers 2004 includes first gas impermeable layer 2010 and second gas impermeable layer 2012. Although number of gas impermeable layers 2004 is depicted as having two layers, number of gas impermeable layers 2004 may have any desirable quantity of layers. In some other non-depicted examples, number of gas impermeable layers 2004 may instead include only one layer. In another non-depicted example, number of gas impermeable layers 2004 may instead include more than two layers.

Number of gas impermeable layers 2004 aids in removal of supportive foam mandrel 2002 from a composite structure (not depicted) after curing. For example, number of gas impermeable layers 2004 contain supportive foam mandrel 2002 after material 2008 is collapsed. After collapse, supportive foam mandrel 2002 may have an irregular shape. In some illustrative examples, supportive foam mandrel 2002 may collapse into multiple pieces. Number of gas impermeable layers 2004 containing all pieces of supportive foam mandrel 2002 when collapsed will aid in removal of supportive foam mandrel 2002 from the composite structure (not depicted). In some illustrative examples, number of gas impermeable layers 2004 may restrict or dissuade supportive foam mandrel 2002 from collapsing into multiple pieces.

When material 2008 is an open cell foam, a vacuum may be pulled within number of gas impermeable layers 2004 to collapse supportive foam mandrel 2002. Number of gas impermeable layers 2004 will contain the vacuum so that the vacuum does not enter release layer 2006. When vacuum is supplied to number of gas impermeable layers 2004, a different pressure is applied to release layer 2006.

To facilitate movement of number of gas impermeable layers 2004 relative to release layer 2006, breather 2014 is positioned between number of gas impermeable layers 2004 and release layer 2006. Breather 2014 allows for distribution of a pressure between second gas impermeable layer 2012 and release layer 2006. Breather 2014 prevents second gas impermeable layer 2012 from sticking to release layer 2006.

Foam mandrel assembly 2000 may be used as at least one of a forming mandrel or a curing mandrel. During forming, any desirable pressure may be present within number of gas impermeable layers 2004 and release layer 2006. In one illustrative example, both number of gas impermeable layers 2004 and release layer 2006 are vented to the environment during forming of a composite material (not depicted).

During curing of a composite structure (not depicted) any desirable pressure may be present in release layer 2006. In some illustrative examples, a positive pressure is applied to release layer 2006. In some illustrative examples, release layer 2006 is vented to the environment. The environment may be an oven, an autoclave, or any other desirable environment for curing a composite structure (not depicted).

Material 2008 is selected from any desirable types of material. Material 2008 is selected to provide structural support to foam mandrel assembly 2000. Material 2008 is selected to collapse during curing of a composite structure (not depicted). Material 2008 is configured to collapse under elevated temperature and elevated pressure of an autoclave (not depicted) without chemical decomposition.

Material 2008 is selected to soften at a temperature above a pressure differential temperature at which pressure differentials within the part being cured are substantially equalized. Material 2008 is selected to soften at a temperature higher than a temperature at which the viscosity of a resin of a composite material to be cured is at a minimum. Material 2008 is selected such that material 2008 softens at a temperature below a maximum temperature of the cure cycle. In some illustrative examples, material 2008 softens within the range of 100 degrees Fahrenheit and 350 degrees Fahrenheit. In some illustrative examples, material 2008 softens within the range of 120 degrees Fahrenheit and 300 degrees Fahrenheit. In some illustrative examples, material 2008 softens within the range of 150 degrees Fahrenheit and 300 degrees Fahrenheit. In some illustrative examples, supportive foam mandrel 2002 is an open cell foam. Material 2008 may be selected to have a desirable density. In some illustrative examples, the density of material 2008 in the range of 1 pound per cubic inch to 16 pounds per cubic inch. In some illustrative examples, the density of material 2008 in the range of 2 pounds per cubic inch to 8 pounds per cubic inch. In one illustrative example where material 2008 is an open cell foam, the open cell foam has a density in the range of 2 pounds per cubic inch to 8 pounds per cubic inch.

Material 2008 is formed into supportive foam mandrel 2002 using any desirable method. For example, material 2008 may be molded, extruded, cut, or shaped in any other desirable fashion into trapezoidal shape 2016. As depicted, supportive foam mandrel 2002 has trapezoidal shape 2016. In other non-depicted illustrative examples, supportive foam mandrel 2002 may have another desirable non-trapezoidal shape. Supportive foam mandrel 2002 may have any desirable shape for providing support to a composite material (not depicted) having a closed cross-section or a substantially closed cross-section.

Figure 21:
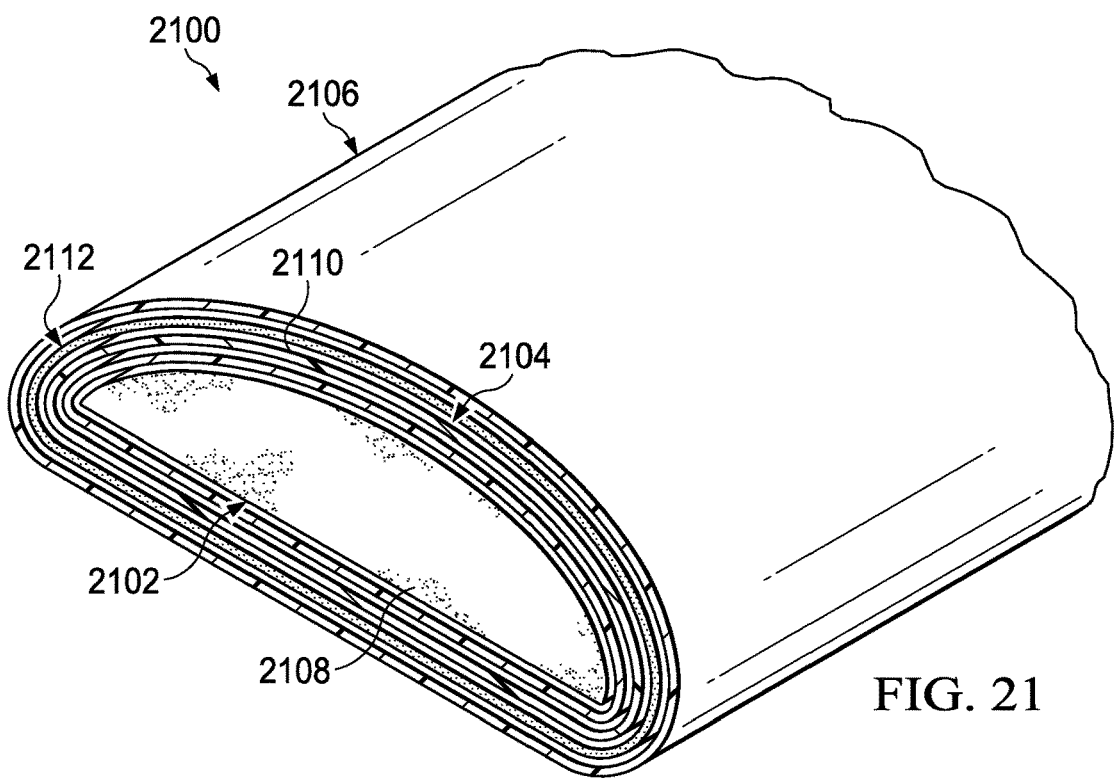
FIG. 21 is an illustration of a perspective view of a foam mandrel assembly in accordance with an illustrative embodiment.

Turning now to FIG. 21, an illustration of a perspective view of a foam mandrel assembly is depicted in accordance with an illustrative embodiment. Foam mandrel assembly 2100 is a physical implementation of foam mandrel assembly 1902 of FIG. 19. Foam mandrel assembly 2100 may be a physical implementation of forming and cure mandrel 210 of FIG. 2. In some illustrative examples, foam mandrel assembly 2100 may replace forming and cure mandrel 502 in FIG. 5, forming and cure mandrel 702 in FIG. 7, or forming and cure mandrel 902 in FIG. 9.

Foam mandrel assembly 2100 is an example of a foam mandrel assembly having a different shape than foam mandrel assembly 2000 of FIG. 20. Foam mandrel assembly 2100 comprises supportive foam mandrel 2102, number of gas impermeable layers 2104, and release layer 2106. Supportive foam mandrel 2102 comprises material 2108 configured to collapse under elevated temperature and elevated pressure of an autoclave without chemical decomposition. Number of gas impermeable layers 2104 surrounds supportive foam mandrel 2102. Release layer 2106 surrounds number of gas impermeable layers 2104.

As depicted, number of gas impermeable layers 2104 includes first gas impermeable layer 2110. Breather 2112 is positioned between first gas impermeable layer 2110 and release layer 2106. Foam mandrel assembly 2100 has a different shape from foam mandrel assembly 2000 of FIG. 20. Foam mandrel assembly 2100 has substantially rounded top 2114 and a non-trapezoidal shape.

Figure 22:
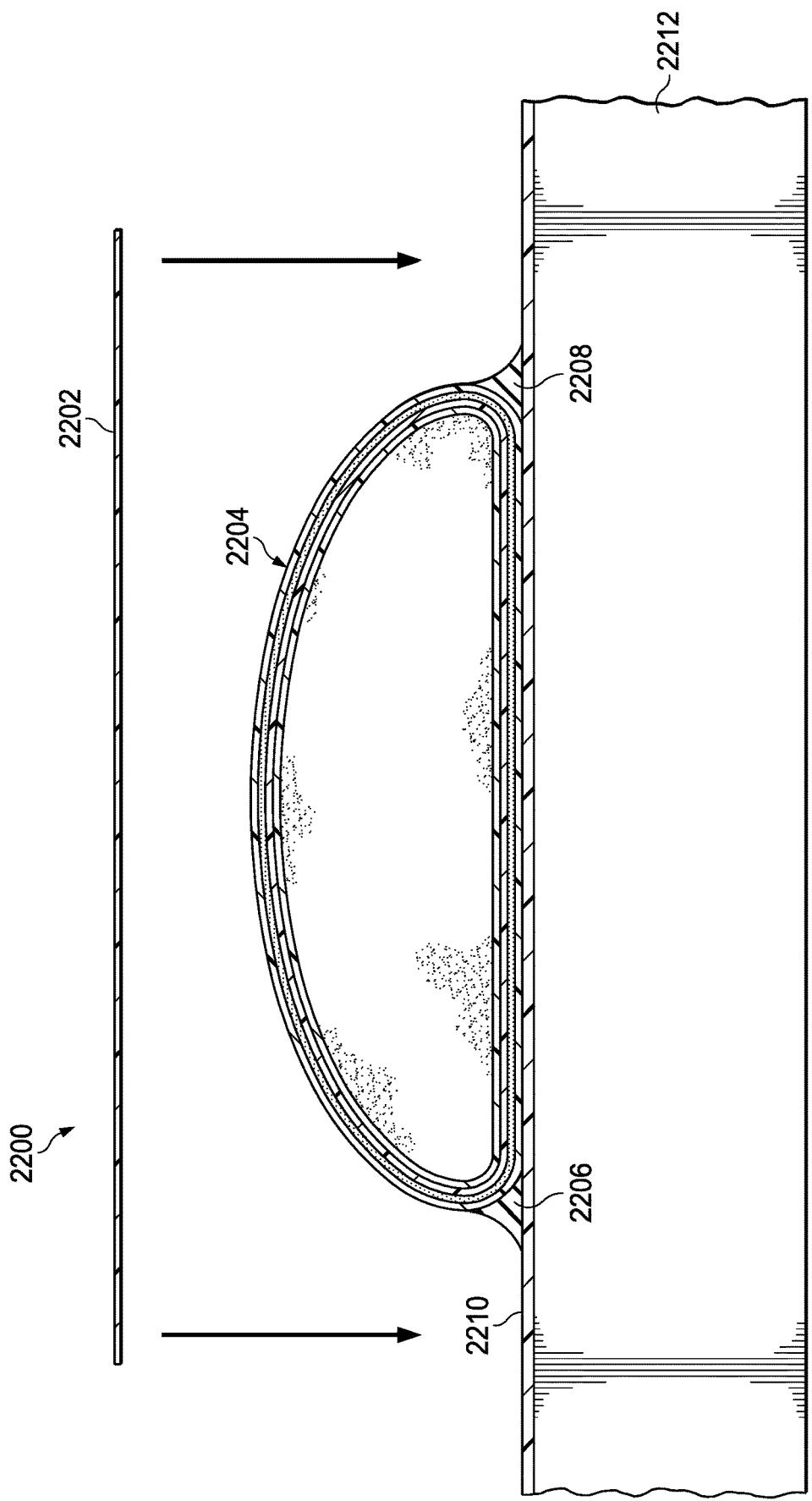
FIG. 22 is an illustration of a cross-sectional view of a composite material being positioned over a foam mandrel assembly in accordance with an illustrative embodiment.

Turning now to FIG. 22, an illustration of a cross-sectional view of a composite material being positioned over a foam mandrel assembly is depicted in accordance with an illustrative embodiment. View 2200 is an illustration of components of a composite stringer package prior to compacting.

Composite charge 2202 is a physical implementation of composite charge 204 of FIG. 2. Composite charge 2202 is placed over foam mandrel assembly 2204, first radius filler 2206, and second radius filler 2208. As depicted, composite charge 2202 is placed over foam mandrel assembly 2204, first radius filler 2206, and second radius filler 2208 as one piece. In some other illustrative examples, composite charge 2202 may instead be placed over foam mandrel assembly 2204, first radius filler 2206, and second radius filler 2208 by laying down composite charge 2202 ply by ply.

Foam mandrel assembly 2204 is a physical implementation of foam mandrel assembly 1902 of FIG. 19. Foam mandrel assembly 2204 is a physical implementation of forming and cure mandrel 210 of FIG. 2. View 2200 of FIG. 22 is similar to the views of FIG. 5, FIG. 7, and FIG. 9 but with a foam mandrel assembly, foam mandrel assembly 2204.

First radius filler 2206 and second radius filler 2208 are physical implementations of first radius filler 207 and second radius filler 208 of FIG. 2. By placing composite charge 2202 over foam mandrel assembly 2204, composite charge 2202 is positioned such that composite charge 2202 contacts foam mandrel assembly 2204. Inner ply 2210 is positioned on rigid base 2212. Inner ply 2210 is a physical implementation of inner ply 216 of FIG. 2. Rigid base 2212 is a physical implementation of rigid base 230 of FIG. 2.

In FIG. 22, mechanical pressure and vacuum pressure have not yet been applied. In FIG. 22, the components are not compacted.

In view 2200, foam mandrel assembly 2204 takes the form of a forming mandrel, such as forming mandrel 1924 of FIG. 19. Supportive foam mandrel 2214 of foam mandrel assembly 2204 provides support during shaping of composite charge 2202. Supportive foam mandrel 2214 is sufficiently rigid to provide resistance to the force applied during compaction.

View 2200 is a first example of a view during a portion of a process of forming a compacted stringer package comprising foam mandrel assembly 2204. In this first example, portions of composite charge 2202, and therefore portions of the resulting composite structure, are formed against foam mandrel assembly 2204.

Figure 23:
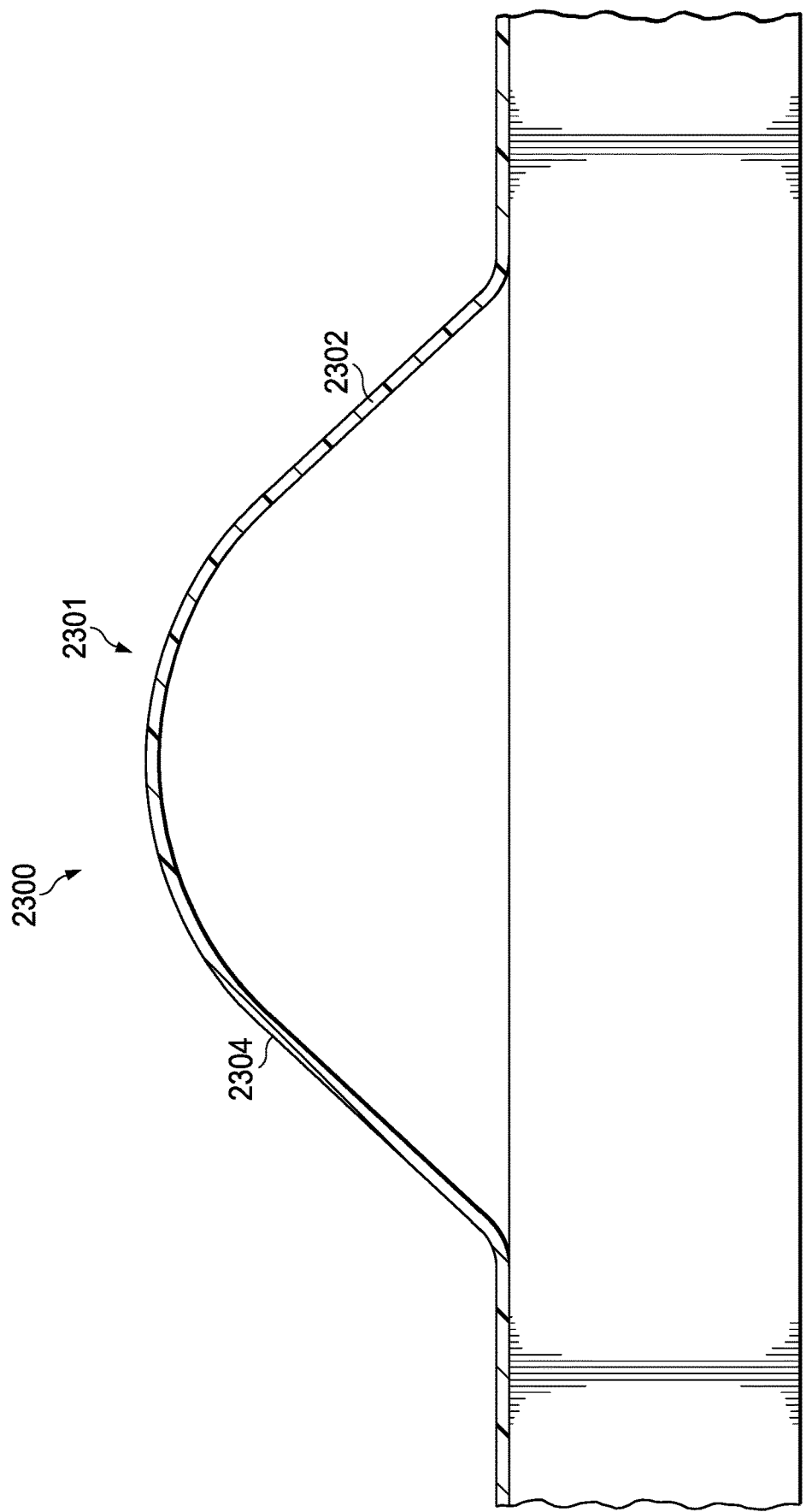
FIG. 23 is an illustration of a cross-sectional view of a stringer to receive a foam mandrel assembly in accordance with an illustrative embodiment.

Turning now to FIG. 23, an illustration of a cross-sectional view of a stringer to receive a foam mandrel assembly is depicted in accordance with an illustrative embodiment. View 2300 is an illustration of components of a composite stringer package after compacting. In view 2300, stringer 2301 formed of composite material 2302 does not yet contact a foam mandrel assembly.

Composite charge 2304 is a physical implementation of composite charge 204 of FIG. 2. Composite charge 2304 has been placed over a forming tool (not depicted). In view 2300, the forming tool has been removed. The forming tool may be removed to facilitate inspection of stringer 2301 formed of composite material 2302. More specifically, the removal of the forming tool allows for inspection within closed cross-section 2306 of composite material 2302.

In some illustrative examples, to remove the forming tool and inspect stringer 2301, stringer 2301 is transferred to a kitting tray tool. After removing the forming tool, a foam mandrel assembly (not depicted), first radius filler (not depicted), and second radius filler (not depicted) are installed within the stringer to form a compacted stringer package.

A physical implementation of foam mandrel assembly 1902 of FIG. 19 is installed within the stringer after removing the forming tool. In this illustrative example, the foam mandrel assembly is not a physical implementation of forming and cure mandrel 210 of FIG. 2, as the foam mandrel assembly is not used to form or shape the stringer. The step depicted in view 2300 of FIG. 23 is an intermediate step for forming a compacted stringer package. The step depicted in view 2300 of FIG. 23 is different from the first example provided in FIG. 22.

View 2300 is a second non-limiting example of a view during a portion of a process of forming a compacted stringer package comprising a foam mandrel assembly. In this second example, portions of composite charge 2304, and therefore portions of the resulting composite structure, are formed against a forming tool. After removing the forming tool, the foam mandrel assembly is installed to provide support during transport and curing of composite material 2302.

Figure 24:
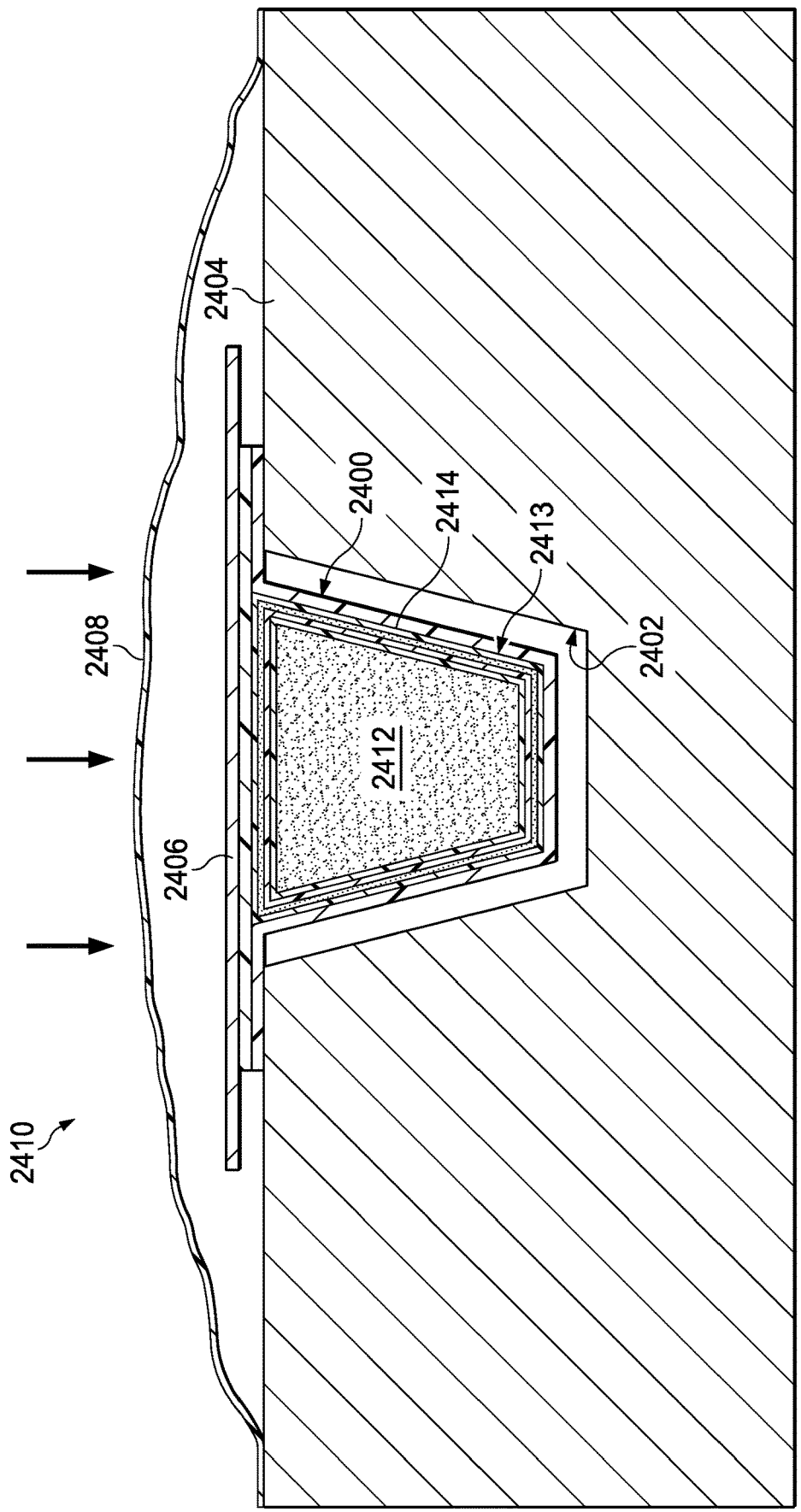
FIG. 24 is an illustration of a cross-sectional view of a foam mandrel assembly within a compacted stringer package prior to cure in accordance with an illustrative embodiment.

Turning now to FIG. 24, an illustration of a cross-sectional view of a foam mandrel assembly within a compacted stringer package prior to cure is depicted in accordance with an illustrative embodiment. As depicted, compacted stringer package 2400 is present within recess 2402 of cure tool 2404. Compacted stringer package 2400 is a physical implementation of compacted stringer package 1936 of FIG. 19. Cure tool 2404 is a physical implementation of cure tool 1964 of FIG. 19.

Caul 2406 is positioned over compacted stringer package 2400 for shaping one side of compacted stringer package 2400 during cure. Caul 2406 is a physical implementation of number of cauls 1966 of FIG. 19. In this illustrative example, caul 2406 and cure tool 2404 are used to cure compacted stringer package 2400 rather than a rigid closed mold.

Vacuum bag 2408 is positioned over compacted stringer package 2400 and cure tool 2404 to form curing assembly 2410. After positioning vacuum bag 2408, curing assembly 2410 may be positioned within an oven (not depicted) or an autoclave (not depicted).

As depicted, supportive foam mandrel 2412 of foam mandrel assembly 2413 has first size 2414. In some illustrative examples, curing assembly 2410 has not yet been exposed to an elevated temperature and elevated pressure of an autoclave. In other illustrative examples, curing assembly 2410 may be subjected to increasing temperatures and increasing pressures in an autoclave but sufficient temperature and pressure have not yet been supplied to collapse supportive foam mandrel 2412. In some illustrative examples, curing assembly 2410 may be subjected to increasing temperatures and increasing pressures in an autoclave but vacuum has not yet been supplied to collapse supportive foam mandrel 2412.

Figure 26:
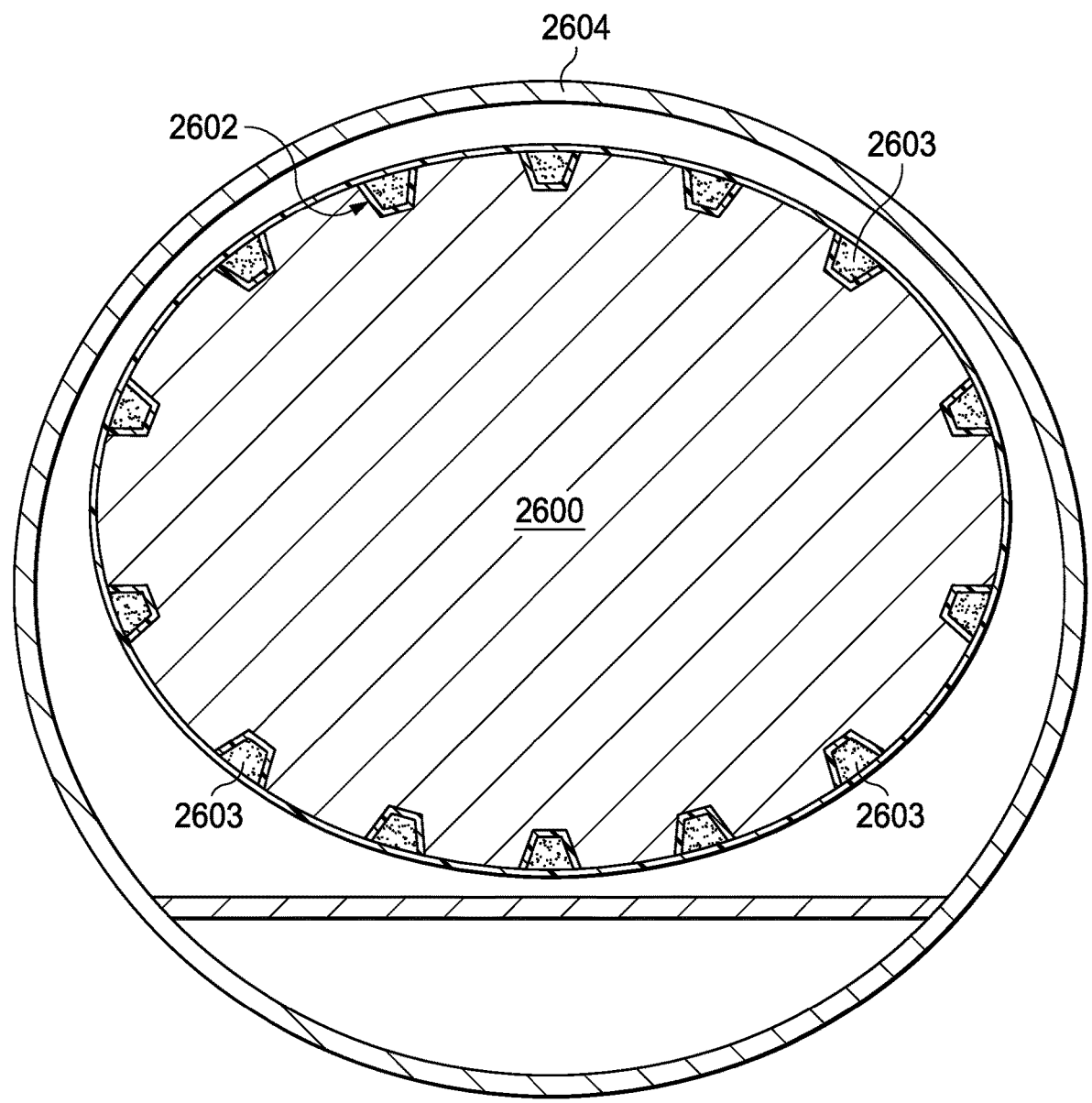
FIG. 26 is an illustration of a cross-sectional view of a cure tool with a plurality of foam mandrel assemblies within an autoclave in accordance with an illustrative embodiment.

Although FIG. 24 only displays one compacted stringer package, compacted stringer package 2400, cure tool 2404 may hold a plurality of compacted stringer packages. FIG. 26 is one non-limiting example of a cure tool holding a plurality of compacted stringer packages. In some illustrative examples, FIG. 24 is a depiction of a portion of cure tool 2404.

Figure 25:
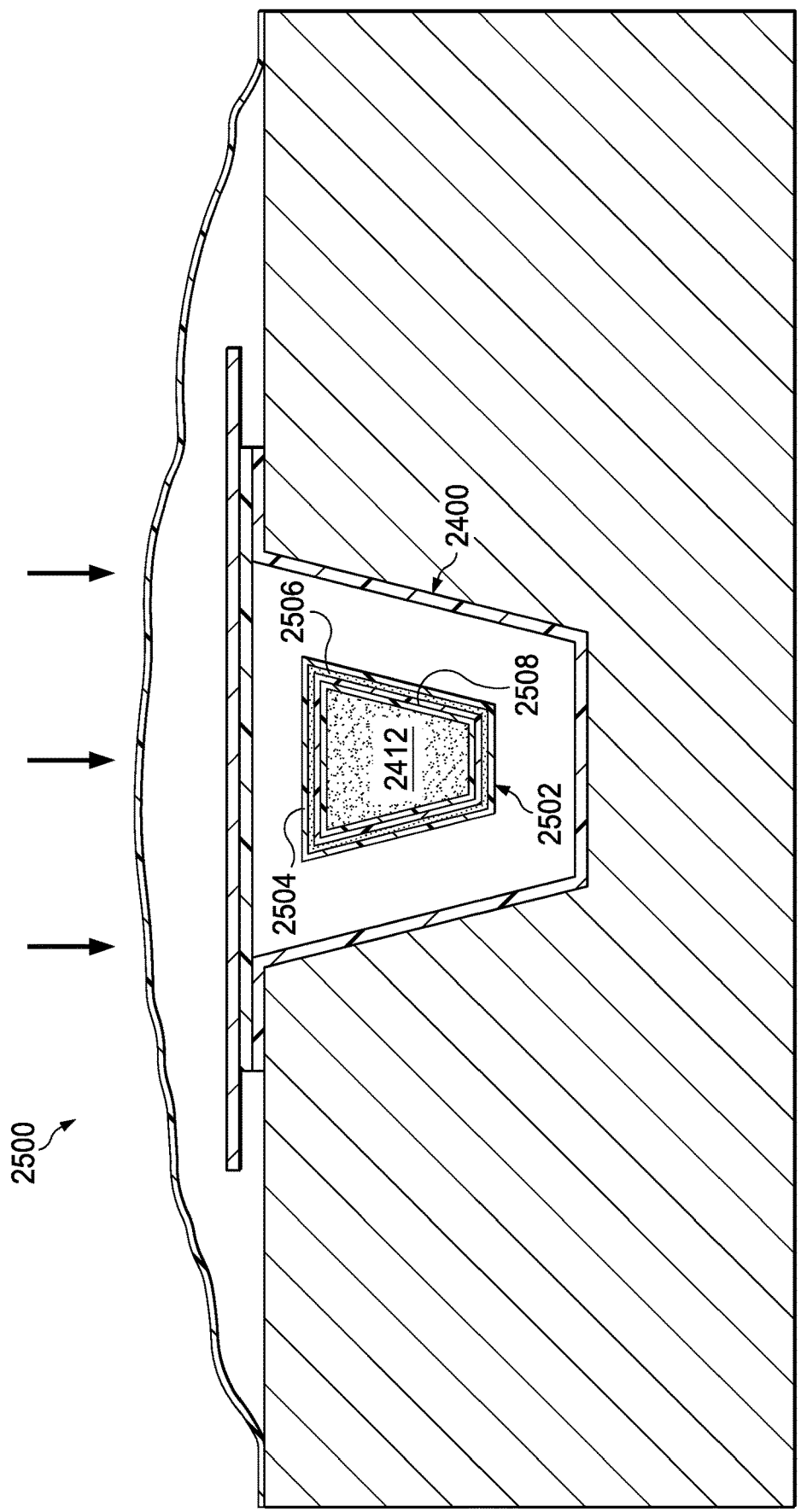
FIG. 25 is an illustration of a cross-sectional view of a foam mandrel assembly within a compacted stringer package after cure in accordance with an illustrative embodiment.

Turning now to FIG. 25, an illustration of a cross-sectional view of a foam mandrel assembly within a compacted stringer package after cure is depicted in accordance with an illustrative embodiment. View 2500 is a view of curing assembly 2410 of FIG. 24 with supportive foam mandrel 2412 at second size 2502. Second size 2502 is smaller than first size 2414. Second size 2502 aids in extraction of foam mandrel assembly 2413 from compacted stringer package 2400 after curing.

As depicted, each component of foam mandrel assembly 2413 including supportive foam mandrel 2412 has shrunk for illustrative purposes only. However, in some illustrative examples, each of component of foam mandrel assembly 2413 may not shrink. In one example, supportive foam mandrel 2412 shrinks while at least one of release layer 2504, breather 2506, or number of gas impermeable layers 2508 do not shrink along with supportive foam mandrel 2412. If a vacuum is pulled on foam mandrel assembly 2413 at least one of release layer 2504, breather 2506, or number of gas impermeable layers 2508 may fold or compress against supportive foam mandrel 2412.

In some illustrative examples, components of foam mandrel assembly 2413 that shrink may not shrink uniformly. For example, supportive foam mandrel 2412 may shrink into a non-uniform cross-section.

In some illustrative examples, supportive foam mandrel 2412 collapses down to second size 2502 due only to elevated temperature and elevated pressure of an autoclave. In other illustrative examples, supportive foam mandrel 2412 collapses down to second size 2502 due to a vacuum being drawn on supportive foam mandrel 2412.

Turning now to FIG. 26, an illustration of a cross-sectional view of a cure tool with a plurality of foam mandrel assemblies within an autoclave is depicted in accordance with an illustrative embodiment. Cure tool 2600 is a physical implementation of cure tool 1964 of FIG. 19. Plurality of compacted stringer packages 2602 is a physical implementation of a plurality of compacted stringer packages including compacted stringer package 1936 of FIG. 19.

Each of plurality of compacted stringer packages 2602 contains a respective foam mandrel assembly of plurality of foam mandrel assemblies 2603 to apply pressure during at least a portion of curing. Each of plurality of compacted stringer packages 2602 is positioned within a respective recess of cure tool 2600. Plurality of compacted stringer packages 2602 is cured simultaneously on cure tool 2600 within autoclave 2604.

During cure of plurality of compacted stringer packages 2602, plurality of foam mandrel assemblies 2603 collapse under elevated temperature and elevated pressure of autoclave 2604 without chemical decomposition. In some illustrative examples, vacuum is applied to at least one foam mandrel assembly of plurality of foam mandrel assemblies 2603 to collapse the at least one foam mandrel assembly.

The different components shown in FIGS. 20-26 may be combined with components in FIG. 19, used with components in FIG. 19, or a combination of the two. Additionally, some of the components in FIGS. 20-26 may be illustrative examples of how components shown in block form in FIG. 19 can be implemented as physical structures.

Further, the different components shown in FIGS. 19-26 may be combined with components in FIG. 2, used with components in FIG. 2, or a combination of the two. Additionally, some of the components in FIGS. 20-26 may be illustrative examples of how components shown in block form in FIG. 2 can be implemented as physical structures.

Figure 27:
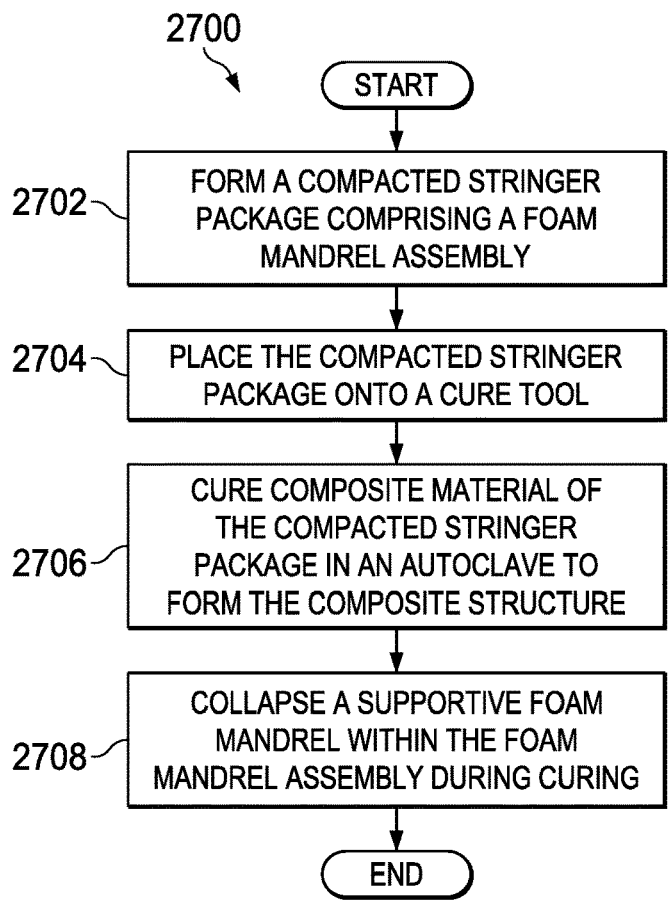
FIG. 27 is an illustration of a flowchart of a method for manufacturing a composite structure in accordance with an illustrative embodiment.

Turning now to FIG. 27, an illustration of a flowchart of a method for manufacturing a composite structure is depicted in accordance with an illustrative embodiment. Method 2700 may be used to manufacture composite structure 1906 of FIG. 19. Method 2700 may be performed with foam mandrel assembly 2000 of FIG. 20 or foam mandrel assembly 2100 of FIG. 21. Method 2700 may be performed using a compacted stringer package formed from the components of FIG. 22 or the components of FIG. 23. Method 2700 may be performed on compacted stringer package 2400 and foam mandrel assembly 2413 of FIGS. 24 and 25. Method 2700 may be performed on the plurality of compacted stringer packages 2602 of FIG. 26.

Method 2700 forms a compacted stringer package comprising a foam mandrel assembly (operation 2702). In some illustrative examples, the supportive foam mandrel is an open cell foam. In one illustrative example, forming the compacted stringer package comprises placing a composite charge over the foam mandrel assembly, a first radius filler, and a second radius filler; applying mechanical pressure to shape the composite charge to the foam mandrel assembly and a rigid base to form a stringer layup; and applying vacuum pressure to the stringer layup to form the compacted stringer package. In another illustrative example, forming the compacted stringer package comprises forming a stringer onto a forming tool; transferring the stringer to a kitting tray tool; and installing the foam mandrel assembly, a first radius filler, and a second radius filler within the stringer to form the compacted stringer package.

Method 2700 places the compacted stringer package onto a cure tool (operation 2704). Method 2700 cures composite material of the compacted stringer package in an autoclave to form the composite structure (operation 2706). Method 2700 collapses a supportive foam mandrel within the foam mandrel assembly during curing (operation 2708). Afterwards the method terminates.

In one illustrative example, collapsing the supportive foam mandrel comprises drawing a vacuum within the foam mandrel assembly to collapse the supportive foam mandrel within the foam mandrel assembly during curing. In another illustrative example, collapsing the supportive foam mandrel comprises the supportive foam mandrel going from a first size to a second size without chemically decomposing, wherein the second size is smaller than the first size. In one illustrative example, collapsing the respective supportive foam mandrel relies on at least one of an elevated temperature or an elevated pressure. In some illustrative examples, the elevated temperature and elevated pressure is within an autoclave.

Figure 28:
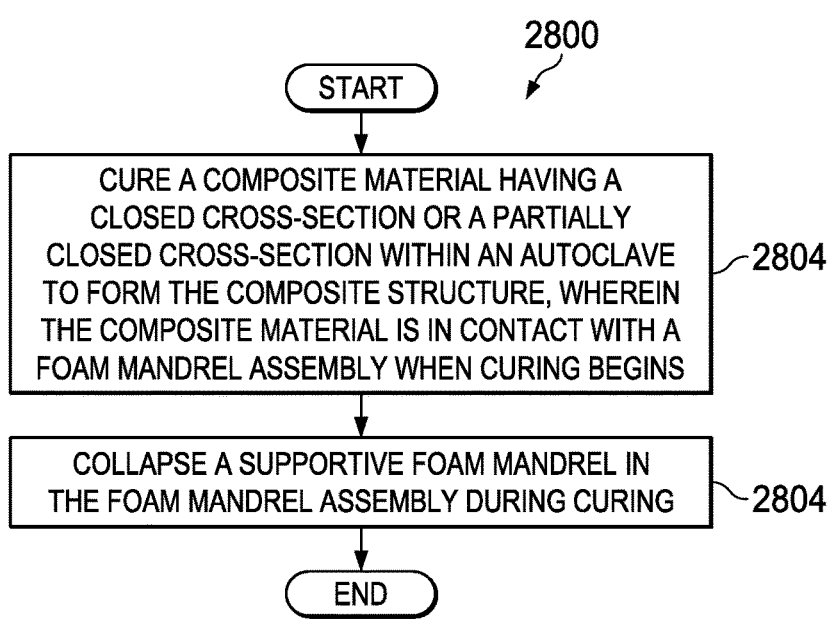
FIG. 28 is an illustration of a flowchart of a method for manufacturing a composite structure in accordance with an illustrative embodiment.

Turning now to FIG. 28, an illustration of a flowchart of a method for manufacturing a composite structure is depicted in accordance with an illustrative embodiment. Method 2800 may be used to manufacture composite structure 1906 of FIG. 19. Method 2800 may be performed with foam mandrel assembly 2000 of FIG. 20 or foam mandrel assembly 2100 of FIG. 21. Method 2800 may be performed using a compacted stringer package formed from the components of FIG. 22 or the components of FIG. 23. Method 2800 may be performed on compacted stringer package 2400 and foam mandrel assembly 2413 of FIGS. 24 and 25. Method 2800 may be performed on the plurality of compacted stringer packages 2602 of FIG. 26.

Method 2800 cures a composite material having a closed cross-section or a partially closed cross-section to form the composite structure, wherein the composite material is in contact with a foam mandrel assembly when curing begins (operation 2802). Method 2800 collapses a supportive foam mandrel in the foam mandrel assembly during curing (operation 2804). Afterwards, the method terminates.

In some illustrative examples, the supportive foam mandrel is an open cell foam. In some illustrative examples, collapsing the respective supportive foam mandrel relies on at least one of elevated temperature or elevated pressure. In some illustrative examples, elevated temperature and elevated pressure are within an autoclave. In some illustrative examples, collapsing the supportive foam mandrel comprises applying a vacuum to the supportive foam mandrel.

The flowcharts and block diagrams in the different depicted illustrative embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the Figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

For example, method 2700 may further comprise pulling the foam mandrel assembly with collapsed foam mandrel from the composite structure after curing. As another example, method 2800 may further comprise placing the composite material onto a cure tool, and placing a number of cauls over the composite material on the cure tool.

The illustrative examples present a method for fabricating an integrally stiffened co-cured composite skin panel comprising the forming of open-structure stringers on a foam forming mandrel that is maintained in position for use during installation on cure mandrel for subsequent installation of skin. Foam mandrel collapses during cure cycle, with optional vacuum assistance, and is removed and may be recycled.

Fabrication of hat stiffeners and other composite structures with a closed cross-section or a partially closed cross-section includes placing a tool inside of a partially trapped cavity which makes removal of a conventional tool undesirably difficult. The illustrative examples provide a rigid foam that collapses during cure of the stiffener to make the extraction step easier than extraction of conventional tools.

The illustrative examples provide a supportive foam mandrel comprising a material that is rigid for layup of composite material, but shrinks down during the normal curing cycle. The supportive foam mandrel is desirably created from a low-cost foam. A low-cost foam can be used as a support mandrel inside a number of gas impermeable layers during carbon fiber layup. The number of gas impermeable layers may take the form of at least one of a low-cost bladder or a tube bag.

The foam collapses under heat and pressure during autoclave cure of the part. The foam material is selected to collapse at any desirable temperature and pressure. The temperature and pressure may be selected based on the composite material to be cured. In one non-limiting example, the temperature and pressure are above 250 degrees Fahrenheit and above 35 psi. In one non-limiting example, the temperature and pressure are approximately 350 degrees Fahrenheit and 90 psi. The foam is then easily extracted after cure.

Tube bag bladders may be used as a release layer. However, tube bag bladders do not have inherent structure to hold shape and oppose forces during composite layup, such as automated fiber placement (AFP) and forming. Therefore, a support secondary support structure is desirably placed inside the tube bag during those operations. The support mandrel concept in the illustrative examples is a single use foam that is rigid at room temperature, but collapses during autoclave cure due to the elevated temperature and pressure.

Current methods for fabricating integrally stiffened co-cured composite structures with hat, omega or other closed element include multiple, often manual, steps to first install stringer, then composite noodles, a mandrel, or other components of the element. This approach ties up a cure mandrel and limits the ability to do parallel work. In this conventional method, each subsequent layup step is performed on the cure mandrel. This process also may be difficult to automate. One of the reasons for the step by step process for installing stringers is that the stringer is initially formed straight and need to be installed into a contour. This can result in wrinkling that needs to be inspected for prior to installation of bladder.

To streamline the installation process of stringers, the foam forming mandrel of the illustrative examples may be used to create co-cured structures. By using the foam forming mandrel also during the cure cycle, complex stringers can be laminated and transferred to cure mandrel as a package. These compacted stringer packages may optimally include noodles, wrap plies, base ply. Using the foam mandrel assembly allows for parallel processing of plurality of stringers that can then quickly be installed into a cure mandrel for subsequent processing. The cure mandrel is not unnecessarily tied up in production using the foam mandrel assembly. By using the foam mandrel assembly for both forming and curing, fewer tools are used. The forming mandrel stays in place during cure and then collapses and is removed after cure. Forming compacted stringer packages have the option to be transferred and installed with automation.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of manufacturing a composite structure, the method comprising:
    forming a compacted stringer package comprising a composite charge, a first radius filler, a second radius filler, and a foam mandrel assembly, wherein the compacted stringer package is sufficiently rigid to transport compacted stringer package without a rigid base, wherein forming the compacted stringer package comprises:
        placing the composite charge over the foam mandrel assembly, the first radius filler, and the second radius filler;
        applying mechanical pressure to shape the composite charge to the foam mandrel assembly and the rigid base to form a stringer layup; and
        applying vacuum pressure to the stringer layup to form the compacted stringer package;
    transporting the compacted stringer package to a cure tool, wherein the compacted stringer package is transported to the cure tool without the rigid base;
    placing the compacted stringer package onto the cure tool;
    curing composite material of the compacted stringer package at an elevated temperature to form the composite structure on the cure tool; and
    collapsing a supportive foam mandrel within the foam mandrel assembly during curing, wherein collapsing the supportive foam mandrel comprises drawing a vacuum within the foam mandrel assembly to collapse the supportive foam mandrel within the foam mandrel assembly during curing.

2. The method of claim 1, wherein collapsing the supportive foam mandrel comprises the supportive foam mandrel going from a first size to a second size without decomposing, wherein the second size is smaller than the first size.

3. The method of claim 1 further comprising:
    pulling the foam mandrel assembly with collapsed foam mandrel from the composite structure after curing.

4. The method of claim 1, wherein the supportive foam mandrel is an open cell foam.

5. The method of claim 1, wherein the vacuum is applied so that the supportive foam mandrel collapses after pressure equalizes in a resin area of the compacted stringer package.

6. The method of claim 1, wherein material of the supportive foam mandrel softens at a temperature above a pressure differential temperature at which pressure differentials within the compacted stringer package being cured are substantially equalized, and wherein the temperature is below a maximum temperature of a cure cycle.

7. The method of claim 1, wherein the supportive foam mandrel is formed of one of polyethylene terephthalate, polyphenylsulfone, or polymethacrylimide.

8. A method of manufacturing a composite structure, the method comprising:
   forming a compacted stringer package comprising a foam mandrel assembly, wherein a pre-preg composite material is in the compacted stringer package and wherein the pre-preg composite material has a closed cross-section or a partially closed cross-section wherein the compacted stringer package is sufficiently rigid to transport compacted stringer package without a rigid base, wherein forming the compacted stringer package comprises:
      placing a composite charge over the foam mandrel assembly, a first radius filler, and a second radius filler;
      applying mechanical pressure to shape the composite charge to the foam mandrel assembly and the rigid base to form a stringer layup; and
      applying vacuum pressure to the stringer layup to form the compacted stringer package;
   transporting the compacted stringer package to a cure tool, wherein the compacted stringer package is transported to the cure tool without the rigid base;
   curing the pre-preg composite material having the closed cross-section or the partially closed cross-section to form the composite structure on the cure tool, wherein the pre-preg composite material is in contact with the foam mandrel assembly when curing begins; and
   collapsing a supportive foam mandrel in the foam mandrel assembly during curing, wherein a material of the supportive foam mandrel softens at a temperature above a pressure differential temperature at which pressure differentials within a part the compacted stringer package being cured are substantially equalized, and wherein the temperature is below a maximum temperature of a cure cycle.

9. The method of claim 8 further comprising:
   placing the pre-preg composite material onto the cure tool; and
   placing a number of cauls over the pre-preg composite material on the cure tool.

10. The method of claim 9, wherein the supportive foam mandrel is an open cell foam.

11. The method of claim 8, wherein collapsing the supportive foam mandrel comprises applying a vacuum to the supportive foam mandrel.

12. The method of claim 8 further comprising:
   curing the pre-preg composite material of the compacted stringer package at an elevated temperature to form the composite structure.

13. A method of manufacturing a composite structure, the method comprising:
   forming a compacted stringer package comprising a composite charge, a first radius filler, a second radius filler, and a foam mandrel assembly, wherein the compacted stringer package is sufficiently rigid to transport compacted stringer package without a rigid base, wherein forming the compacted stringer package comprises:
      placing the composite charge over the foam mandrel assembly, the first radius filler, and the second radius filler;
      applying mechanical pressure to shape the composite charge to the foam mandrel assembly and the rigid base to form a stringer layup; and
      applying vacuum pressure to the stringer layup to form the compacted stringer package;
   transporting the compacted stringer package to a cure tool, wherein the compacted stringer package is transported to the cure tool without the rigid base;
   placing the compacted stringer package onto the cure tool;
   curing composite material of the compacted stringer package at an elevated temperature to form the composite structure on the cure tool; and
   collapsing a supportive foam mandrel within the foam mandrel assembly during curing, wherein collapsing the supportive foam mandrel relies on at least one of an elevated temperature or an elevated pressure.

* * * * *